(12) United States Patent
Konishi

(10) Patent No.: US 8,144,994 B2
(45) Date of Patent: Mar. 27, 2012

(54) IMAGE PROCESSING METHOD, IMAGE PROCESSING APPARATUS, IMAGE READING APPARATUS, IMAGE FORMING APPARATUS, AND RECORDING MEDIUM

(75) Inventor: Yohsuke Konishi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1171 days.

(21) Appl. No.: 11/938,107

(22) Filed: Nov. 9, 2007

(65) Prior Publication Data

US 2008/0187249 A1 Aug. 7, 2008

(30) Foreign Application Priority Data

Nov. 13, 2006 (JP) ................... 2006-306735
Oct. 5, 2007 (JP) ................... 2007-262612

(51) Int. Cl.
*G06K 9/62* (2006.01)

(52) U.S. Cl. ............... 382/209; 382/306; 707/E17.008; 707/E17.052

(58) Field of Classification Search .................. 382/209, 382/306; 707/1, 100
See application file for complete search history.

(56) References Cited

U.S. PATENT DOCUMENTS

| 4,653,021 A * | 3/1987 | Takagi ................................ 1/1 |
| 5,465,353 A | 11/1995 | Hull et al. |
| 5,799,115 A | 8/1998 | Asano et al. |
| 7,167,580 B2 * | 1/2007 | Klein et al. .................. 382/112 |
| 7,233,945 B2 * | 6/2007 | Shiiyama ............................ 1/1 |
| 2005/0165747 A1 * | 7/2005 | Bargeron et al. ................. 707/3 |

FOREIGN PATENT DOCUMENTS

| JP | 8-7071 A | 1/1996 |
| JP | 2001-5831 A | 1/2001 |
| JP | 2005-208977 A | 8/2005 |
| JP | 2006/092957 A | 9/2006 |

* cited by examiner

*Primary Examiner* — Gregory M Desire
(74) *Attorney, Agent, or Firm* — Birch, Stewart, Kolasch & Birch, LLP

(57) ABSTRACT

A plurality of type identifiers are stored that contains one or a plurality of image identifiers each for identifying each of a plurality of reference images and thereby identifies a type of a document. Then, it is determined whether each of a plurality of obtained document images is similar to a reference image. When a document image is determined as being similar to a reference image, an image identifier that identifies the reference image is selected from among a plurality of image identifiers. Then, a type identifier is identified that contains the selected image identifier. Then, document images each similar to a reference image are classified for each identified type identifier.

13 Claims, 24 Drawing Sheets

FIG.4

| -3 | -3 | -1 | 1  | -1 | -2 | -3 |
|----|----|----|----|----|----|----|
| -2 | -2 | 1  | 4  | 1  | -2 | -2 |
| -1 | 1  | 8  | 15 | 8  | 1  | -1 |
| 1  | 5  | 16 | 25 | 16 | 5  | 1  |
| -1 | 1  | 8  | 15 | 8  | 1  | -1 |
| -2 | -2 | 1  | 4  | 1  | -2 | -2 |
| -3 | -2 | -1 | 1  | -1 | -2 | -3 |

FIG.12A

| HASH VALUE | PAGE INDEX OF DOCUMENT |
|---|---|
| H1 | ID1 |
| H2 | ID1, ID3 |
| H3 | ID1, ID2 |
| H4 | ID1, ID3 |
| H5 | ID1 |
| H6 | ID1, ID2 |
| ... | ... |

| HASH VALUE | PAGE INDEX OF DOCUMENT |
|---|---|
| H1 | ID1, ID1 |
| H2 | ID1, ID3 |
| H3 | ID1, ID2 |
| H4 | ID1, ID3 |
| H6 | ID1, ID2 |
| ... | ... |

2461

| DOCUMENT TYPE INDEX | DOCUMENT PAGE INDEX | HASH VALUES | THE NUMBER OF STORED PAGES |
|---|---|---|---|
| DocID1 | ID1 | H1, H2, H4, H5, H6 ··· | 3 |
| | ID2 | H3, H6, ··· | |
| | ID3 | H2, H4, ··· | |

FIG. 15

| OPTION NUMBER | CONTENT OF OUTPUT PROCESSING |
|---|---|
| OP1 | PERMIT FILING OF DOCUMENT IMAGE |
| OP2 | PERMIT ENCRYPTION AND FILING OF DOCUMENT IMAGE |
| OP3 | INHIBIT FILING OF DOCUMENT IMAGE |
| OP4 | PERMIT COPY OF DOCUMENT IMAGE |
| OP5 | INHIBIT COPY OF DOCUMENT IMAGE |
| OP6 | PERMIT ELECTRONIC DISTRIBUTION OF DOCUMENT IMAGE |
| OP7 | INHIBIT ELECTRONIC DISTRIBUTION OF DOCUMENT IMAGE |

FIG. 16

| DOCUMENT TYPE INDEX | DOCUMENT PAGE INDEX | THE NUMBER OF STORED PAGES | OUTPUT PROCESS OPTION NUMBER |
|---|---|---|---|
| DocID1 | ID1, ID2, ID3 | 3 | OP1 |
| DocID2 | ID4, ID5 | 2 | OP2 |
| DocID3 | ID6, ID7, ID8, ID9 | 4 | OP3 |
| DocID4 | ID10, ID11 | 2 | OP4 |
| ⋮ | ⋮ | ⋮ | ⋮ |

FIG. 21

| DOCUMENT TYPE INDEX | PAGE COUNTER OF DOCUMENT TYPE INDEX | DOCUMENT PAGE INDEX | THE NUMBER OF STORED PAGES | OUTPUT PROCESS OPTION NUMBER |
|---|---|---|---|---|
| DocID1 | PC (DocID1) | ID1, ID2, ID3 | 3 | OP1 |
| DocID2 | PC (DocID2) | ID4, ID5 | 2 | OP2 |
| DocID3 | PC (DocID3) | ID6, ID7, ID8, ID9 | 4 | OP3 |
| DocID4 | PC (DocID4) | ID10, ID11 | 2 | OP4 |
| ... | ... | ... | ... | ... |

IMAGE PROCESSING METHOD, IMAGE PROCESSING APPARATUS, IMAGE READING APPARATUS, IMAGE FORMING APPARATUS, AND RECORDING MEDIUM

CROSS-REFERENCE TO RELATED APPLICATIONS

This Nonprovisional application claims priority under 35 U.S.C. §119(a) on Patent Application No. 2006-306735 and No. 2007-262612 filed in Japan on Nov. 13, 2006 and Oct. 5, 2007 respectively, the entire contents of which are hereby incorporated by reference.

BACKGROUND

1. Field of the Invention

The present application relates to: an image processing method and an image processing apparatus in which it is determined whether an obtained document image is similar to a reference image stored in advance, and then on the basis of the determination result, the document image is clarified; an image reading apparatus and an image forming apparatus employing the image processing apparatus; and a recording medium that carries a computer program for implementing the image processing apparatus.

2. Description of Related Art

A technique is known in which a document composed of a plurality of pages is partitioned at desired pages so that the document is classified, and then the page images of individual classified documents are filed separately. In an exemplary method, partition sheets having an identification mark are inserted at breaks of the document in advance. Then, when an identification mark recorded on a partition sheet is detected among the page images obtained by reading the document through an image reading apparatus such as a scanner, the document is partitioned. In another exemplary method, when a document is to be read by an image reading apparatus, the numbers of pages for partitioning a document are specified in advance. Then, when the document of a specified number of pages is read, the document is partitioned.

Further, in order that filing processing for page images obtained by reading a document should be achieved in a short time, an image filing apparatus is proposed in which: page images of a plurality of sub-documents are read successively and stored; then, index information is generated for referring to each of the page images; then, index information for each page is stored in a manner partitioned for each sub-document, on the basis of the specified number of pages for one sub-document; so that without the necessity of performing filing processing on page images at each time when page images for one sub-document have been read, filing processing is performed document by document on the page images of a plurality of sub-documents (e.g., see Japanese Patent Application Laid-Open No. H8-7071)

Nevertheless, in the method that partition sheets are inserted into a document like in prior art or the apparatus described in Japanese Patent Application Laid-Open No. H8-7071, at each time of scan processing for a document, partition sheets need be inserted at desired positions of the document before the scan. Further, the partition sheets need be searched and removed from the document after the scan. Further, in the method that the number of pages of one sub-document is specified in advance, the kind of the number of pages that is allowed to be specified is restricted to one. Thus, documents can merely be partitioned using always the same number of pages. This has caused a problem that filing processing for page images is not achieved for a document in which the number of pages for each sub-document differs from each other. Further, for the purpose of processing of a document in which the number of pages for each sub-document differs from each other, a description file that defines the number of pages of each of a plurality of sub-documents need be generated. Then, the generated description file need be read in advance. This has caused a problem that when there are a large number of kinds in the numbers of pages constituting the document, the work of generating the description file is complicated.

SUMMARY

The present application has been made in view of such situations. An object of the present application is to provide an image processing method and an image processing apparatus in which: it is determined whether each of a plurality of document images is similar to a reference image; then, when similarity is concluded, a type identifier containing one or a plurality of image identifiers that identify the reference image is identified; then, document images each similar to a reference image are classified for each identified type identifier; so that without the necessity of special operation by a user, the document images can be classified in accordance with a configuration for a document stored in advance. Also provided are: an image reading apparatus and an image forming apparatus employing the image processing apparatus; and a recording medium that carries a computer program for implementing the image processing apparatus.

Another object of the present application is to provide: an image processing method and an image processing apparatus in which document images in the number of image identifiers contained in the type identifier are classified for each type identifier so that the document images can be classified in the unit of the number of document sheets stored in advance; and an image reading apparatus and an image forming apparatus employing the image processing apparatus.

Another object of the present application is to provide an image processing method and an image processing apparatus in which: at each time when a document image is determined as being similar to a reference image, the number of document images determined as being similar is counted up; then, it is determined whether the counted number of document images agrees with the number of image identifiers contained in the type identifier; then, when the number of document images is determined as agreeing with the number of image identifiers, the document image is determined as being the last document image to be classified to the type identifier; by virtue of this, when a large number of document images are to be classified, documents can easily be partitioned; so that separations between documents to be classified can be detected and separated. Also provided are an image reading apparatus and an image forming apparatus employing the image processing apparatus.

Another object of the present application is to provide an image processing method and an image processing apparatus in which: at each time when a document image is determined as being similar to a reference image, the number of document images determined as being similar is counted up; then, the counted number of document images is stored; then, it is determined whether the number of stored document images agrees with the number of image identifiers contained in the type identifier; then, when the number of document images is determined as agreeing with the number of image identifiers, the document image is determined as being the last document image to be classified to the type identifier; so that even when page substitution arises between a plurality of sub-documents to be classified, classification of the document and partitioning of the document are achieved. Also provided are an image reading apparatus and an image forming apparatus employing the image processing apparatus.

Another object of the present application is to provide an image processing method and an image processing apparatus in which: the features of a document image is extracted; then, on the basis of the extracted features and the stored features of a reference image, an image identifier corresponding to the features is identified; then, the document image is determined as being similar to a reference image identified by the image identifier; by virtue of this, without the necessity of storing the reference images themselves, document images each similar to a reference image can easily be classified merely by storing features corresponding to the reference images. Also provided are an image reading apparatus and an image forming apparatus employing the image processing apparatus.

Another object of the present application is to provide: an image processing method and an image processing apparatus in which output processing such as filing (recording), copying, facsimile transmission, and electronic distribution is achieved separately for each document image to be classified; and an image reading apparatus and an image forming apparatus employing the image processing apparatus.

Another object of the present application is to provide an image processing method and an image processing apparatus in which: an image identifier is set up that identifies one or a plurality of the reference images having been inputted; then, a type identifier is set up that contains the set-up image identifier; then, the features of the reference image is extracted; then, the type identifier and the image identifier having been set up as well as the extracted features are stored in a manner in correspondence to each other; by virtue of this, without the necessity of special operation by a user, a configuration for a document to be classified can easily be stored. Also provided are an image reading apparatus and an image forming apparatus employing the image processing apparatus.

In order to achieve the above objects, an image processing method according to the present application is characterized by comprising the steps of: storing a plurality of type identifiers each of which contains one or a plurality of image identifiers each for identifying each of a plurality of reference images and thereby identifies a type of a document; determining whether each of a plurality of obtained document images is similar to a reference image; when a document image is determined as being similar to a reference image, selecting an image identifier that identifies said reference image, from among a plurality of image identifiers; identifying a type identifier that contains the selected image identifier; and classifying document images each similar to a reference image, for each identified type identifier.

The image processing method according to the present application is also characterized in that document images in the number of image identifiers contained in a type identifier are classified for each type identifier.

The image processing method according to the present application is also characterized by comprising the steps of: at each time when a document image is determined as being similar to a reference image) counting up the number of document images determined as being similar; determining whether the counted number of document images is equals to the number of image identifiers contained in the type identifier; and when said number of document images is determined as being equal to the number of image identifiers, determining that said document image is the last document image to be classified to said type identifier.

The image processing method according to the present application is also characterized by comprising the steps of: at each time when a document image is determined as being similar to a reference image, counting up the number of document images determined as being similar; storing the counted number of document images, as associating with the type identifier; determining whether the number of stored document images is equals to the number of image identifiers contained in said type identifier; and when said number of document images is determined as being equal to the number of image identifiers, determining that said document image is the last document image to be classified to said type identifier.

The image processing method according to the present application is also characterized by comprising the steps of: storing features and image identifiers of the reference images as being associated with each other; extracting features of a document image; identifying an image identifier on the basis of the extracted features and the stored features of a reference image; and determining that said document image is similar to a reference image identified by said image identifier.

The image processing method according to the present application is also characterized by comprising the steps of: controlling output processing for the document images is performed separately for each type identifier.

The image processing method according to the present application is also characterized by comprising the steps of: receiving an instruction for storing a reference image; setting up an image identifier that identifies one or a plurality of the reference images having been inputted; setting up a type identifier that contains the set-up image identifier; extracting features of said reference image; and storing the type identifier and the image identifier having been set up as well as the extracted features, as associating with each other.

An image processing apparatus according to the present application is characterized by comprising: a storage section for storing a plurality of type identifiers each of which contains one or a plurality of image identifiers each for identifying each of a plurality of reference images and thereby identifies a type of a document; and a controller capable of performing operations of: determining whether each of a plurality of obtained document images is similar to a reference image; when a document image is determined as being similar to a reference image, selecting an image identifier that identifies said reference image, from among a plurality of image identifiers; identifying a type identifier that contains the selected image identifier; and classifying document images each similar to a reference image, for each identified type identifier.

The image processing apparatus according to the present application is also characterized in that: document images in the number of image identifiers contained in a type identifier are classified for each type identifier.

The image processing apparatus according to the present application is also characterized in that: said controller is further capable of performing operations of at each time when a document image is determined as being similar to a reference image; counting up the number of document images determined as being similar; determining whether the counted number of document images is equals to the number of image identifiers contained in the type identifier; and when said number of document images is determined as being equal to the number of image identifiers, determining that said document image is the last document image to be classified to said type identifier.

The image processing apparatus according to the present application is also characterized in that: said controller is further capable of performing operations of: at each time when a document image is determined as being similar to a reference image, counting up the number of document images determined as being similar; storing the counted number of document images, as associating with the type identifier; determining whether the number of stored document images is equals to the number of image identifiers contained in said type identifier; and when said number of document images is determined as being equal to the number of image identifiers, determining that said document image is the last document image to be classified to said type identifier.

The image processing apparatus according to the present application is also characterized in that: features and image identifiers of the reference images are stored as being associated with each other in the storage section; and said controller is further capable or performing operations of: extracting features of a document image; identifying an image identifier on the basis of the extracted features and the stored features of a reference image; and determining that said document image is similar to a reference image identified by said image identifier.

The image processing apparatus according to the present application is also characterized in that: said controller is further capable of controlling output processing for the document images separately for each type identifier.

The image processing apparatus according to the present application is also characterized in that: said controller is further capable of performing operations of receiving an instruction for storing a reference image; when the instruction is received, setting up an image identifier that identifies one or a plurality of the reference images having been inputted; setting up a type identifier that contains the set-up image identifier; extracting features of said reference image; and storing into the storage section the type identifier and the image identifier having been set up as well as the extracted features, as associating with each other.

An image reading apparatus according to the present application is characterized by comprising: an image reading section for reading an image; and an image processing apparatus according to claim 8; wherein the image read by said image reading apparatus is processed by said image processing apparatus.

An image forming apparatus according to the present application is characterized by comprising: an image processing apparatus according to claim 8; and an image forming section for forming an output image on the basis of the image processed by the image processing apparatus.

A recording medium according to the present application is characterized by storing thereon a computer program executable to perform the steps of determining whether each of a plurality of inputted document images is similar to any one of reference images; when the document image is determined as being similar to a reference image, selecting an image identifier that identifies said reference image from among a plurality of image identifiers each for identifying a reference image; identifying a type identifier that contains the selected image identifier, from among a plurality of type identifiers that contains one or a plurality of image identifiers and identifies a type of a document; and classifying document images each similar to a reference image, for each identified type identifier.

In the present application, a plurality of type identifiers are stored in advance each of which contains one or a plurality of image identifiers each for identifying each of a plurality of reference images. A type identifier (document type index) corresponds, for example, to what identifies each sub-document (the type of a document) composed of a plurality of pages, and identifies a classification unit used when a large number of documents are classified document by document. Further, an image identifier (a document page index) is used for identifying each reference image, and identifies each document page constituting a document. That is, the stored document is classified in accordance with the document type index (type identifier). Then, the document classified in accordance with the document type index contains reference images identified by one or a plurality of sub-document page indexes (image identifier).

It is determined whether each document image is similar to a reference image. The method of similarity determination may be, for example, such that features extracted from individual images are compared with each other so that similarity is calculated. When a document image is determined as being similar to a reference image, an image identifier is selected that identifies the reference image from among a plurality of image identifiers. Then, a type identifier is identified that contains the selected image identifier. Thus, it is determined which type identifier contains the reference image similar to the document image. Further, the type identifier can be identified. Document images each similar to a reference image are classified for each identified type identifier. By virtue of this, the document images are classified in accordance with a configuration for a document classified for each type identifier. Further, this avoids the necessity of special operation (e.g., insertion of partition sheets and input of the number of pages to be partitioned) by a user.

Here, in the present application, the obtained document image indicates, for example: a document image obtained by reading a document image with a scanner; a document image in the form of electronic data generated by write-in necessary information into data of a predetermined format with a computer; and scanned filing data generated by converting data read with a scanner into a predetermined file format such as JPEG.

Further, in the present application, document images in the number of image identifiers contained in the type identifier are classified for each type identifier. For example, in a case that a type identifier (a document type index) contains three image identifiers (document page indices), when each of document images is similar to any one of the reference images identified by the three image identifiers, the document images are classified into the three document images on the basis of the type identifiers. By virtue of this, document images are classified by the unit of the number of document sheets stored in advance.

Further, in the present application, at each time when a document image is determined as being similar to a reference image, the number of document images determined as being similar is counted up. Then, it is determined whether the counted number of document images agrees with the number of image identifiers contained in the type identifier. When the number of document images is determined as agreeing with the number of image identifiers, the document image is determined as being the last document image to be classified to the type identifier. For example, in a case that a type identifier (a document type index) contains three image identifiers (document page indices), at each time when the document image is determined as being similar to a reference image, the number of document images is counted up. Then, when the counted value reaches 3, the document image is determined as being the last document image to be classified to the type identifier. Accordingly, even when a large number of documents are to be classified, document images can be classified in accordance with the required number of sheets for each type identifier. Further, the documents can easily be partitioned, while positions between the documents to be classified can be detected and separated.

Further, in the present application, each time when a document image is determined as being similar to a reference image, the number of document images determined as being similar is counted up. Then, the counted number of document images is stored in correspondence to the type identifier. Then, it is determined whether the number of stored document images agrees with the number of image identifiers contained in the corresponding type identifier. When the number of document images is determined as agreeing with the number of image identifiers, the document image is determined as being the last document image to be classified to the type identifier. For example, in a case that a type identifier (a document type index) contains three image identifiers (document page indices), at each time when the document image is determined as being similar to a reference image, the number of document images is counted up, while the counted number of document images is stored. Then, when the stored counted value reaches 3, the document image is determined as being the last document image to be classified to the type identifier. Since, the counted number of document images is stored in a manner in correspondence to the type identifier, even when page substitution arises between a plurality of sub-documents to be classified, classification of the document and partitioning of the document are achieved.

Further, in the present application, the features (e.g., hash values) and the image identifiers (document page indices) of reference images are stored in advance in a manner in correspondence to each other, for example, in the form of a hash table. The features (e.g., hash value) of a document image is extracted. Then, it is determined whether the extracted features agrees with features stored in the hash table. In case of agreement, voting is performed for the image identifier corresponding to the features. Similar processing is performed for each features of the document image. Then, an image identifier having the greatest number of votes is identified, so that the document image is determined as being similar to a reference image identified by the image identifier having the greatest number of votes.

Further, in the present application, output processing (e.g., filing, copying, facsimile transmission, and electronic distribution) for the document images is controlled separately for each type identifier. Thus, in addition to the classification of the document images, required processing can be performed on each classified document image.

Further, in the present application, when an instruction for storing a reference image is received, an image identifier (document page index) is set up that identifies one or a plurality of the reference images having been inputted. Then, a type identifier (document type index) is set up that contains the set-up image identifier. Then, features (e.g., a hash value) is extracted from the inputted reference image. Then, the extracted features and the image identifier (document page index) of the reference image are stored in correspondence to each other, for example, in the form of a hash table. Accordingly, without the necessity of special operation (e.g., insertion of partition sheets and input of the number of pages to be partitioned) by a user, a configuration for a document to be classified can easily be stored.

In the present application, it is determined whether each of a plurality of document images is similar to a reference image. Then, when similarity is concluded, a type identifier containing one or a plurality of image identifiers that identify the reference image is identified. Then, document images each similar to a reference image are classified for each identified type identifier. Accordingly, without the necessity of special operation by a user, the document images can be classified in accordance with a configuration for a document stored in advance.

Further, in the present application, document images in the number of image identifiers contained in the type identifier are classified for each type identifier. Thus, even when the number of document sheets differs depending on each document, document images are classified by the unit of the number of document sheets stored in advance.

Further, in the present application, at each time when a document image is determined as being similar to a reference image, the number of document images determined as being similar is counted up. Then, it is determined whether the counted number of document images agrees with the number of image identifiers contained in the type identifier. When the number of document images is determined as agreeing with the number of image identifiers, the document image is determined as being the last document image to be classified to the type identifier. Accordingly, when a large number of document images are to be classified, the documents can easily be partitioned. Further, positions between documents to be classified can be detected and separated.

Further, in the present application, each time when a document image is determined as being similar to a reference image, the number of document images determined as being similar is counted up. Then, the counted number of document images is stored in correspondence to the type identifier. Then, it is determined whether the number of stored document images agrees with the number of image identifiers contained in the type identifier. When the number of document images is determined as agreeing with the number of image identifiers, the document image is determined as being the last document image to be classified to the type identifier. Accordingly, even when page substitution arises between a plurality of sub-documents to be classified, classification of the document and partitioning of the document are achieved.

Further, in the present application, the features of a document image is extracted. Then, on the basis of the extracted features and the stored features of a reference image, an image identifier corresponding to the features is identified, so that the document image is determined as being similar to a reference image identified by the image identifier. Accordingly, without the necessity of storing the reference images themselves, document images each similar to a reference image can easily be classified merely by storing features corresponding to the reference images.

Further, in the present application, output processing for the document images is performed separately for each type identifier. Accordingly, output processing such as filing (recording), copying, facsimile transmission, and electronic distribution is achieved separately for each document image to be classified.

Further, in the present application, an image identifier is set up that identifies one or a plurality of the reference images having been inputted. Then, a type identifier is set up that contains the set-up image identifier. Further, the features of a reference image is extracted. Then, the type identifier and the image identifier having been set up as well as the extracted features are stored in a manner in correspondence to each other. Accordingly, without the necessity of special operation by a user, a configuration for a document to be classified can easily be stored.

The above and further objects and features of the invention will more fully be apparent from the following detailed description with accompanying drawings.

BRIEF DESCRIPTION OF THE SEVERAL VIEWS OF THE DRAWINGS

FIG. 4 is an explanation diagram showing an example of a filter coefficient of a filtering section;

FIGS. 12A and 12B are explanation diagrams showing a structure of a hash table;

FIG. 15 is an explanation diagram showing an example of output processing;

FIG. 16 is an explanation diagram showing a structure of a document classification table;

FIG. 21 is an explanation diagram showing a structure of a document classification table of Embodiment 2;

DETAILED DESCRIPTION

Embodiment 1

Figure 1:
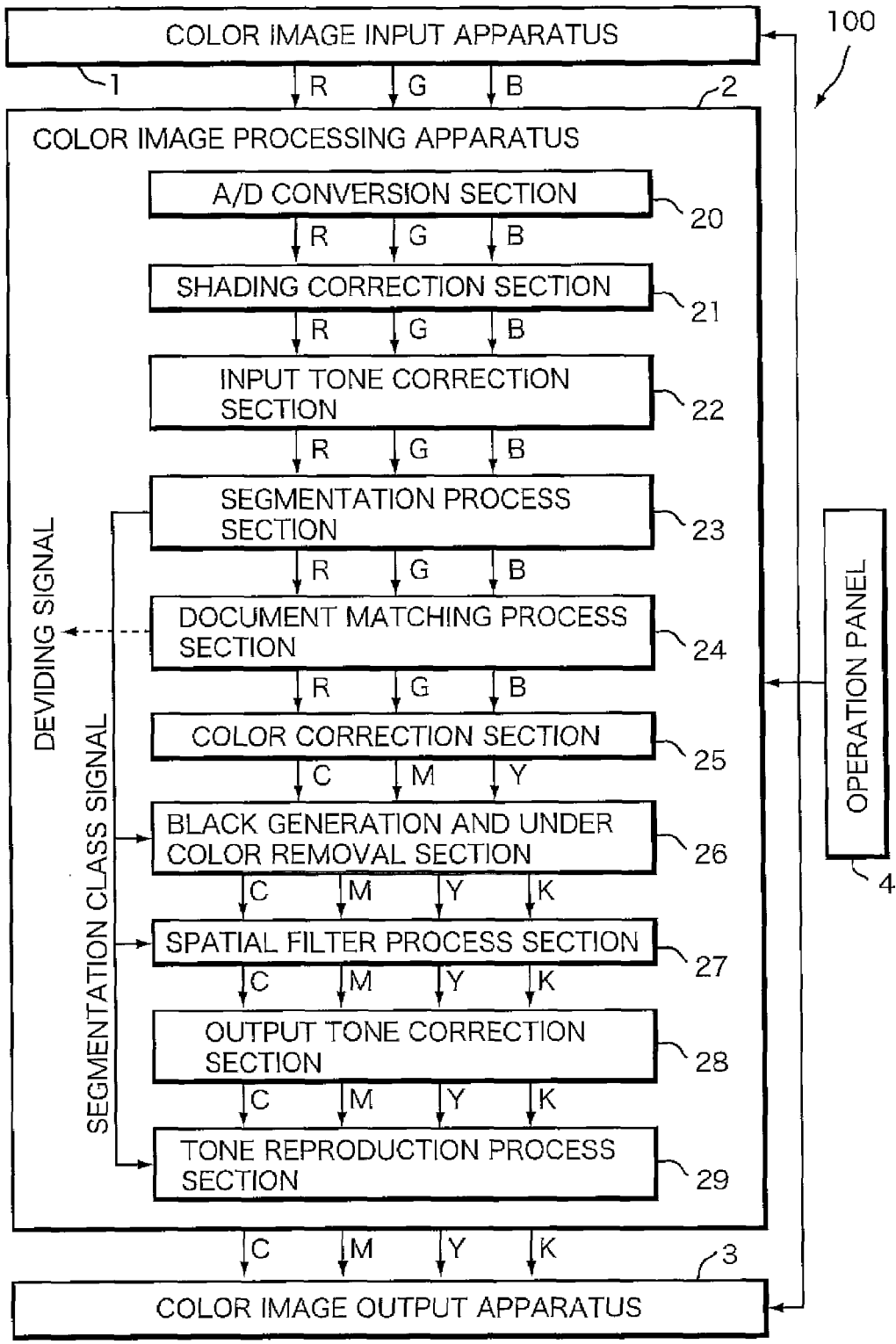
FIG. 1 is a block diagram showing a configuration of an image forming apparatus employing an image processing apparatus according to the present embodiment.

The present invention is described below with reference to the drawings illustrating an embodiment. FIG. 1 is a block diagram showing the configuration of an image forming apparatus 100 employing an image processing apparatus according to the present embodiment. The image forming apparatus 100 (e.g., a digital color copying machine or a multi-function printer provided with combined functions such as a printer function, a filing function, and a facsimile and e-mail distribution function) includes a color image input apparatus 1, a color image processing apparatus 2 (an image processing apparatus), a color image output apparatus 3 serving as image forming means, and an operation panel 4 for various kinds of operation. Image data of analog signals of RGB (R: red, G: green, B: blue) obtained when the color image input apparatus 1 reads a document is outputted to the color image processing apparatus 2, then processed by predetermined processing in the color image processing apparatus 2, and then outputted to the color image output apparatus 3 as digital color signals of CMYK (C: cyan, M: magenta, Y: yellow, K: black).

The color image input apparatus 1 is, for example, a scanner provided with a CCD (Charged Coupled Device). The color image input apparatus 1 reads a reflected light image from the document image in the form of analog signals of RGB, and then outputs the read RGB signals to the color image processing apparatus 2. Further, the color image output apparatus 3 is image forming means employing an electrophotography method or an inkjet method for outputting the image data of the document image onto a record paper sheet. Further, the color image output apparatus 3 may be a display unit such as a display.

The color image processing apparatus 2 is provided with individual processing sections described later, and constructed from ASIC (Application Specific Integrated Circuit) or the like.

An A/D conversion section 20 converts the RGB signals inputted from the color image input apparatus 1 into, for example, 10-bit digital signals, and then outputs the converted RGB signals to a shading correction section 21.

The shading correction section 21 performs correction processing in which various kinds of distortion generated in the illuminating system, the image focusing system, and the image sensing system of the color image input apparatus 1 is removed from the inputted RGB signals. Further, the shading correction section 21 performs the processing of converting the signals into those such as a density (pixel value) signal easily treated by the image processing system adopted in the color image processing apparatus 2 and the processing of adjusting the color-balance, and then outputs the corrected RGB signals to the input tone correction section 22.

The input tone correction section 22 performs image quality adjustment processing such as page background density removing or contrast, and then outputs the processed RGB signals to a segmentation processing section 23.

On the basis of the inputted RGB signals, the segmentation process section 23 separates individual pixels of the inputted image into a text component, a halftone component, and a photograph component (a continuous tone component). On the basis of the segmentation result, the segmentation process section 23 outputs a segmentation class signal indicating that each pixel belongs to which region, to a black generating and ground color removing section 26, a spatial filter process section 27, an output tone correction section 28, and a tone reproduction process section 29. Further, the segmentation process section 23 outputs the inputted RGB signals intact to a document matching process section 24 of the subsequent stage.

The document matching process section 24 binarized the inputted image (document image), then calculates feature points (e.g., the centroid) of a connected component specified on the basis of the binary image, then selects a plurality of feature points from among the calculated feature points, then obtains an invariant on the basis of the selected feature points, and then calculates features (e.g., a hash value) serving as an invariant. In a document storing mode in which a document is to be stored, the document matching process section 24 stores the inputted image as a reference image on the basis of the calculated features. Further, when document images are to be classified, the document matching process section 24 determines whether each document image is similar to a reference image, on the basis of the calculated features (feature vector). Then, on the basis of the determination result, the document matching process section 24 classifies the document images for each document type. Further, the document matching process section 24 outputs the inputted RGB signals intact to the color correction section 25 of the subsequent stage. In place of the above-mentioned configuration that the document matching process section 24 is provide in the subsequent stage of the segmentation process section 23, the document matching process section 24 may be provided in parallel to the input tone correction section 22, or alternatively between the shading correction section 21 and the input tone correction section 22.

Here, the obtained document image indicates, for example: a document image obtained by reading a document image with a scanner; a document image in the form of electronic data generated by write-in necessary information into data of a predetermined format with a computer; and scanned filing data generated by converting data read with a scanner into a predetermined file format such as JPEG.

The color correction section 25 converts the inputted RGB signals into the color space of CMY, then performs color correction in accordance with the features of the color image output apparatus 3, and then outputs the corrected CMY signals to the black generation and under color removal section 26. Specifically for the purpose of high fidelity in color reproduction, the color correction section 25 performs the processing of removing color impurity on the basis of the spectral features of the CMY color materials containing useless absorption components.

On the basis of the CMY signals inputted from the color correction section 25, the black generation and under color removal section 26 generates a K (black) signal and, at the same time, subtracts the K signal from the inputted CMY signals so as to generate new CMY signals, and then outputs the generated CMYK signals to the spatial filter process section 27.

An example of processing in the black generation and under color removal section 26 is described below. For example, in the case of processing of black generation by using skeleton black, the input-output features of the skeleton curve is expressed by $y=f(x)$, inputted data is denoted by C, M, and Y, outputted data is denoted by C', M', Y', and K', and the UCR (Under Color Removal) ratio is denoted by $\alpha$ ($0<\alpha<1$). Then, data outputted in the black generation and background removing processing is expressed by $K'=f\{\min(C,M,Y)\}$, $C'=C-\alpha K'$, $M'=M-\alpha K'$, and $Y'=Y-\alpha K'$.

The spatial filter process section 27 performs spatial filtering by means of a digital filter based on the segmentation class signal, onto the CMYK signals inputted from the black generation and under color removal section 26. By virtue of this, the spatial frequency features of the image data is corrected so that blur occurrence or graininess degradation is avoided in the output image in the color image output apparatus 3. For example, in order to improve the reproducibility of, especially, achromatic text or chromatic text, the spatial filter process section 27 performs edge enhancement processing so as to emphasize high frequency components for the region separated into a text component by the segmentation process section 23. Further, the spatial filter process section 27 performs low pass filtering for removing the input halftone components, onto the region separated into a halftone component by the segmentation process section 23. The spatial filter process section 27 outputs the processed CMYK signals to the output tone correction section 28.

The output tone correction section 28 performs output tone correction processing of converting the CMYK signals inputted from the spatial filter process section 27 into a halftone screen ratio which is a characteristic value of the color image output apparatus 3. Then, the output tone correction section 28 outputs the CMYK signals having undergone the output gray level correction processing to the tone reproduction process section 29.

On the basis of the segmentation class signal inputted from the segmentation process section 23, the tone reproduction process section 29 performs predetermined processing on the CMYK signals inputted from the output tone correction section 28. For example, in order to improve the reproducibility of, especially, achromatic text or chromatic text, the tone reproduction process section 29 performs binarization processing or multi-level dithering processing on the region separated into a text component, such that the signals should become appropriate for the reproduction of high frequency components in the color image output apparatus 3.

Further, the tone reproduction process section 29 performs tone reproduction processing (halftone generation) on the region separated into a halftone component by the segmentation process section 23, such that the image is finally separated into pixels so that each tone can be reproduced. Further, the tone reproduction process section 29 performs binarization processing or multi-level dithering processing on the region separated into a photograph component by the segmentation process section 23, such that the signals should become appropriate for the tone reproduction in the color image output apparatus 3.

The color image processing apparatus 2 temporarily stores into a storage section (not shown) the image data (CMYK signals) processed by the tone reproduction process section 29. Then, in a predetermined timing of performing image formation, the color image processing apparatus 2 reads the image data stored in the storage section, and then outputs the read image data to the color image output apparatus 3. The control described here is performed, for example, by a CPU (not shown).

The operation panel 4 includes, for example: a display section such as a liquid crystal display; and a time setting button and the like. On the basis of information inputted through the operation panel 4 (e.g., specification of a document storing mode for storing a document; and option selection of output processing such as filing, copying, and electronic distribution for a document image for each document to be classified), operation of the color image input apparatus 1, the color image processing apparatus 2, and the color image output apparatus 3 is controlled.

Figure 2:
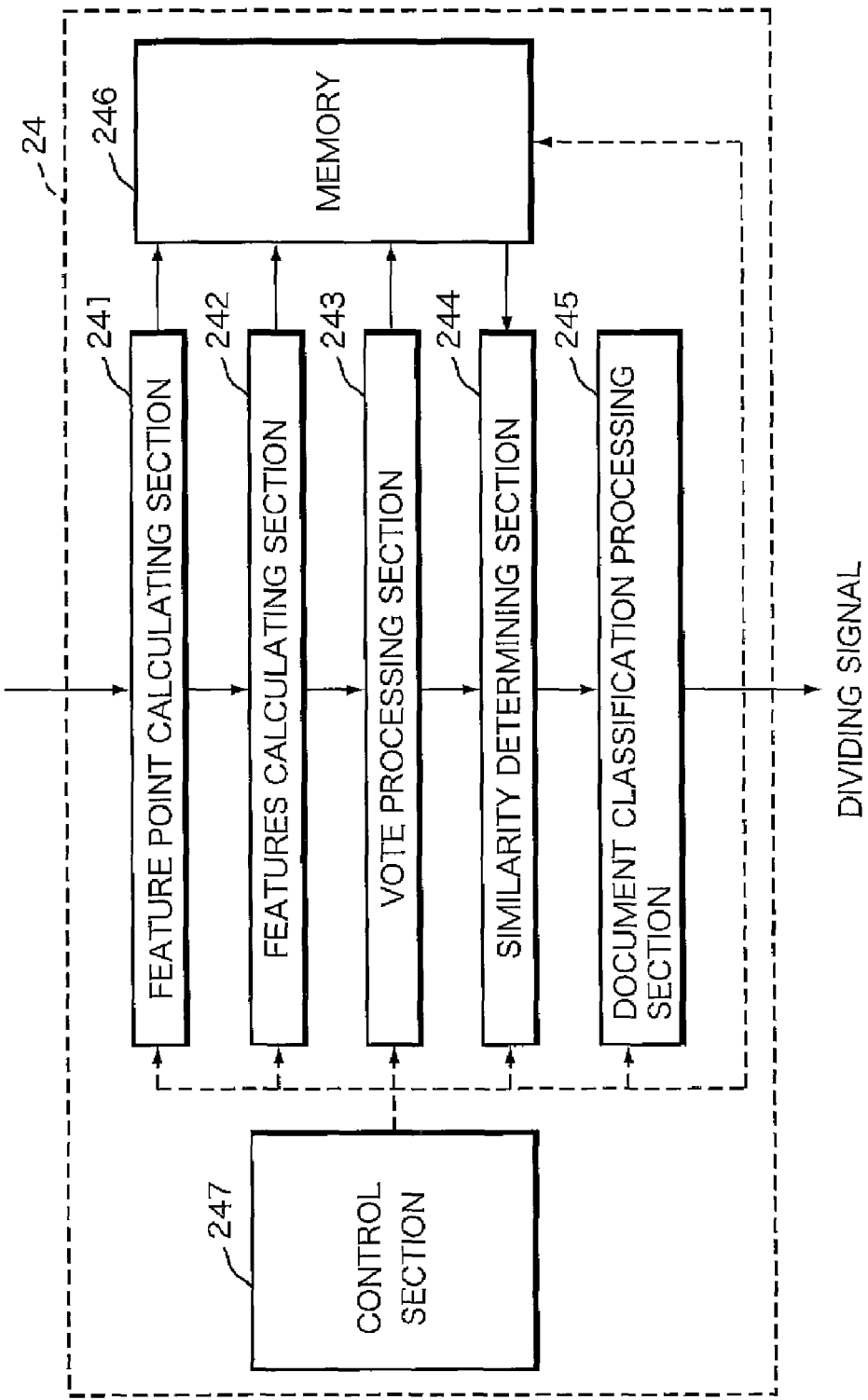
FIG. 2 is a block diagram showing a configuration of a document matching process section.

FIG. 2 is a block diagram showing the configuration of the document matching process section 24. The document matching process section 24 includes a feature point calculating section 241, a features calculating section 242, a vote processing section 243, a similarity determining section 244, a document classification processing section 245, a memory 246, and a control section 247 for controlling these sections.

The feature point calculating section 241: performs later-described predetermined processing on the inputted image and, at the same time, performs binarization of the inputted image; extracts (calculates) the feature points of the connected component identified on the basis of the binary image (e.g., a value obtained by accumulating the coordinate values of the individual pixels constituting a connected component in the binary image and by dividing the accumulated coordinate value with the number of pixels contained in the connected component); and then outputs the extracted feature point to the features calculating section 242.

Figure 3:
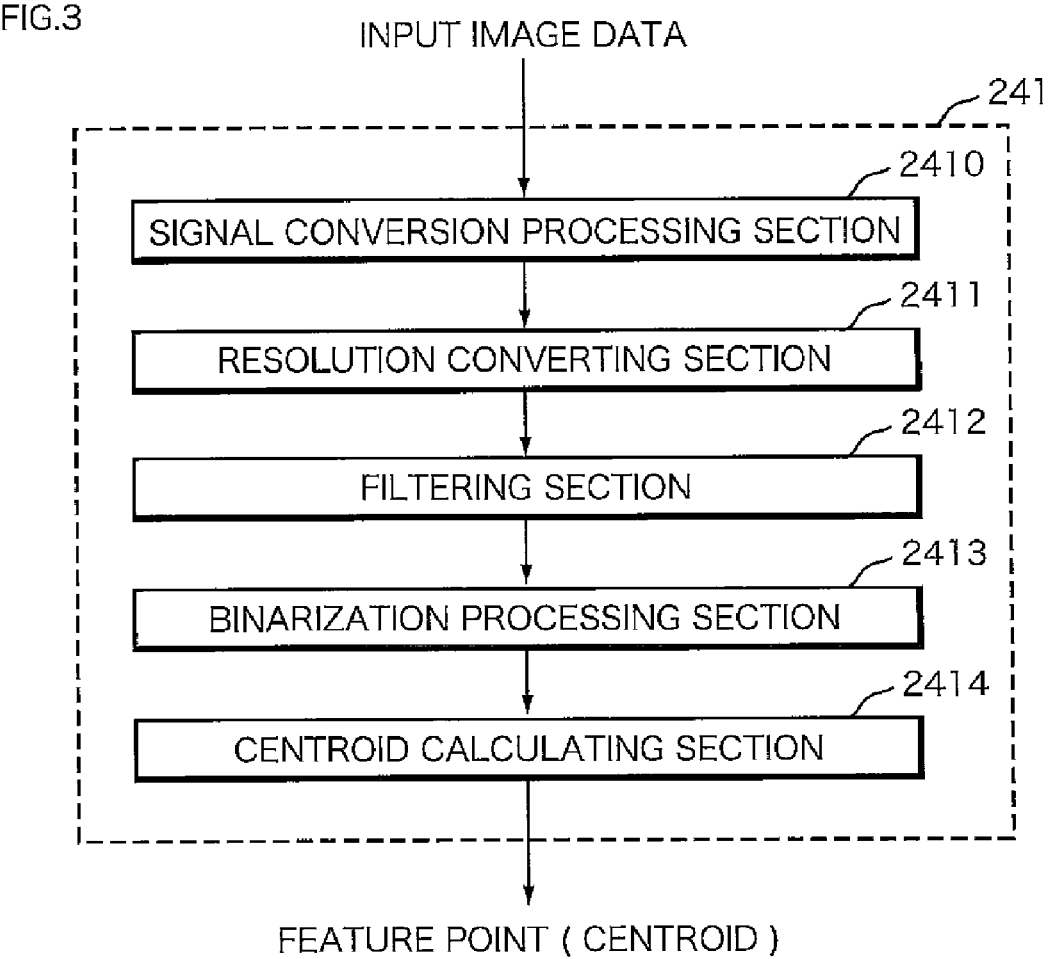
FIG. 3 is a block diagram showing a configuration of a feature point calculating section.

FIG. 3 is a block diagram showing the configuration of the feature point calculating section 241. The feature point calculating section 241 includes a signal conversion processing section 2410, a resolution converting section 2411, a filtering section 2412, a binarization processing section 2413, and a centroid calculating section 2414.

When the inputted image is a color image, the signal conversion processing section 2410 achromatizes and converts the color image into a luminance signal or a lightness signal, and then outputs the converted image to the resolution converting section 2411. For example, when the color components RGB of each pixel is denoted respectively by Rj, Gj, and Bj, and the luminance signal for each pixel is denoted by Yj, the luminance signal Y is expressed by Yj=0.30×Rj+0.59×Gj+0.11×Bj. Here, the present invention is not limited to this formula. That is, the RGB signals may be converted into CIE1976 L*a*b* signals.

Even when the inputted image is one having undergone optical magnification change in the color image input apparatus 1, the resolution converting section 2411 performs magnification change on the inputted image again such as to realize a predetermined resolution, and then outputs to the filtering section 2412 the image having undergone the magnification change. By virtue of this, even when magnification change processing has been performed by the color image input apparatus 1 so that the resolution has varied, extraction of a feature point is achieved free from its influence. This permits accurate classification of the document. In particular, in the case of size-reduced characters, a possibility is avoided that when a connected component is to be specified by binarization processing, blotted characters cause intrinsically separated regions to be specified as if they are connected to each other so that the calculated centroid may deviate. Further, the resolution converting section 2411 converts the image into that of a resolution smaller than the resolution obtained when the image is read by the color image input apparatus 1 with unity magnification. For example, an image read at 600 dpi (dot per inch) by the color image input apparatus 1 is converted into that of 300 dpi. This reduces the amount of processing in the subsequent stage.

The filtering section 2412 corrects the spatial frequency features of the inputted image (e.g., enhancement processing and smoothing of the image), and then outputs the corrected image to the binarization processing section 2413. Since the spatial frequency features of the color image input apparatus 1 is different depending on each model, the filtering section 2412 corrects the different spatial frequency features into required features. In the image (e.g., image signal) outputted from the color image input apparatus 1, degradation such as blurring in the image is caused by, for example: optical system components such as lenses and mirrors; the aperture ratio, the transfer efficiency, and the after-image of the light acceptance surface of CCD; and the storage effect and the scanning unevenness caused by the physical scan. The filtering section 2412 performs enhancement processing on the boundary or the edges so as to restores degradation such as blurring generated in the image. Further, the filtering section 2412 performs smoothing for suppressing high frequency components which are unnecessary in the feature point extracting processing performed in the subsequent stage. This permits accurate extraction of a feature point, and hence achieves accurate determination of the similarity of the image. Here, the filter coefficient used in the filtering section 2412 may be set up appropriately in accordance with the model, the features, or the like of the employed color image input apparatus 1.

FIG. 4 is an explanation diagram showing an example of the filter coefficient of the filtering section 2412. As shown in the figure, the spatial filter is, for example, a mixing filter that has a size of 7×7 (seven rows by seven columns) and that performs enhancement processing and smoothing processing. The pixels of the inputted image are scanned so that arithmetic processing by the spatial filter is performed on all the pixels. Here, the size of the spatial filter is not limited to the size of 7×7. That is, the size may be 3×3, 5×5, or the like. Further, the numerical value of the filter coefficient is an example. That is, the actual value is not limited to this example, and may be set up appropriately in accordance with the model, the features, or the like of the employed color image input apparatus 1.

The binarization processing section 2413 compares with a threshold the luminance value (the luminance signal) or the lightness value (the lightness signal) of the inputted image so as to binarize the image, and then outputs to the centroid calculating section 2414 the binary image having undergone the binarization.

On the basis of the binarization information (e.g., expressed by "1" and "1") of each pixel of the binary image inputted from the binarization processing section 2413, the centroid calculating section 2414 performs labeling (label attaching processing) on each pixel. Then, the centroid calculating section 2414 specifies a connected component where pixels having the same label are in succession, then extracts as a feature point the centroid of the specified connected component, and then outputs the extracted feature point to the features calculating section 242. Here, the feature point is expressed by the coordinate values (x-coordinate, y-coordinate) in the binary image.

Figure 5:
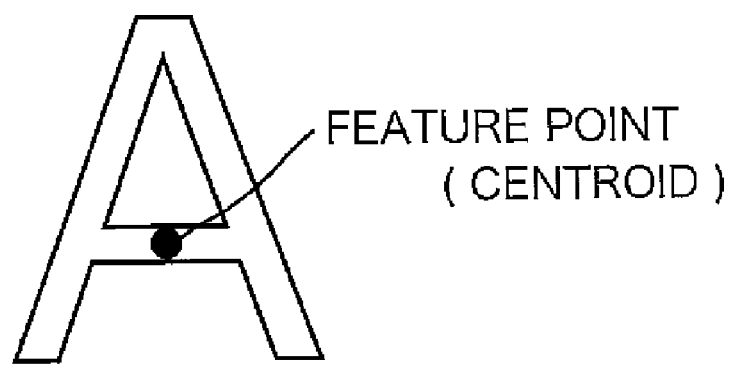
FIG. 5 is an explanation diagram showing an example of a feature point of a connected component.

FIG. 5 is an explanation diagram showing an example of a feature point of a connected component. In the figure, the specified connected component is a character "A", and is specified as a set of pixels to which the same label is imparted. A feature point (centroid) of this character "A" is located at a position (x-coordinate, y-coordinate) indicated by a black dot in the figure.

Figure 6:
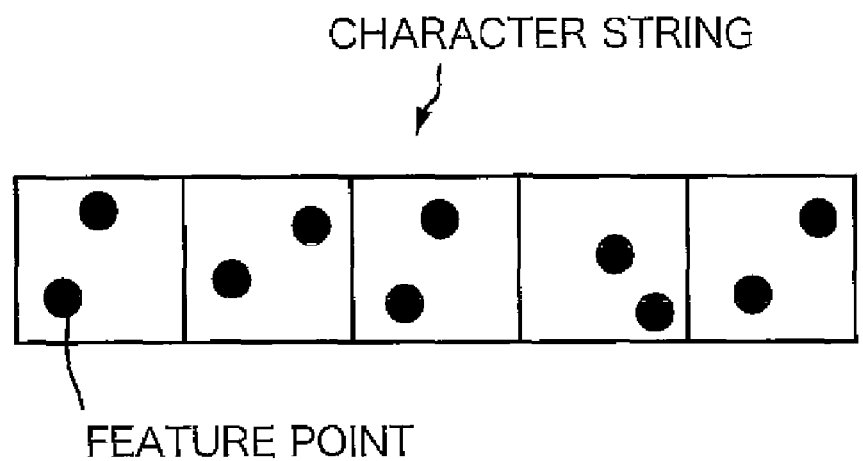
FIG. 6 is an explanation diagram showing an example of a result of extraction of a feature point for a character string.

FIG. 6 is an explanation diagram showing an example of a result of extraction of a feature point for a character string. In the case of a character string composed of a plurality of characters, a plurality of feature points are extracted that have different coordinates depending on the kinds of characters.

The features calculating section 242 adopts, as a current feature point, each feature point (that is, coordinate values of the centroid of the connected component) inputted from the feature point calculating section 241, and then extracts, for example, surrounding four feature points having smaller distances from the current feature point.

Figure 7:
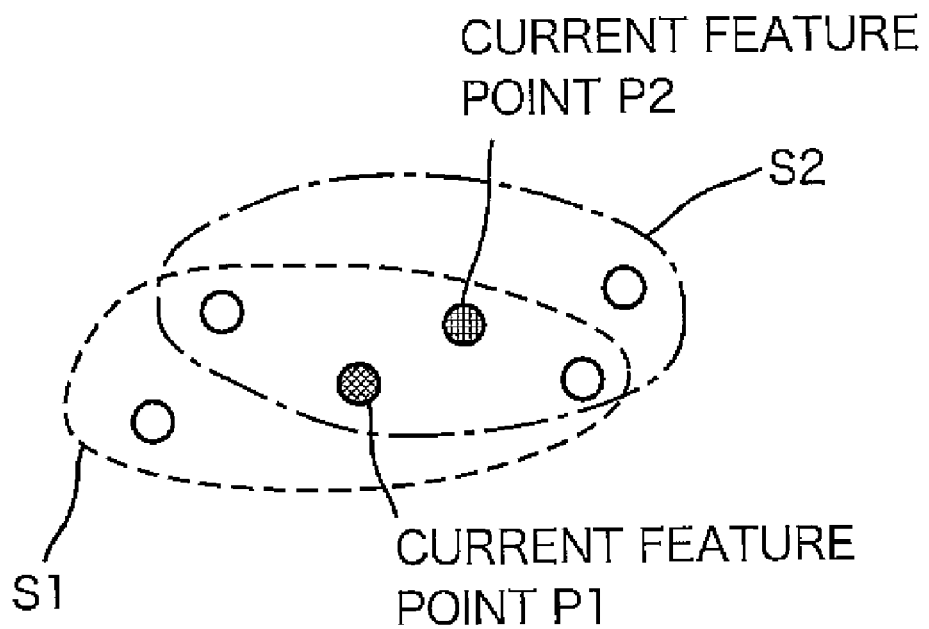
FIG. 7 is an explanation diagram showing the current feature point and the surrounding feature point.

FIG. 7 is an explanation diagram showing current feature points and surrounding feature points. As shown in the figure, as for a current feature point P1, for example, in ascending order of distance from the current feature point P1, four feature points surrounded by a closed curve S1 are extracted (for the current feature point P1, a current feature point P2 also is extracted as one feature point). Further, as for the current feature point P2, for example, similarly to the above-mentioned case, in ascending order of distance from the current feature point P2, four feature points surrounded by a closed curve S2 are extracted (for the current feature point P2, the current feature point P1 also is extracted as one feature point).

The features calculating section 242 selects three feature points from the four extracted feature points so as to calculate an invariant. Here, the number of selected feature points is not limited to three. That is, four, five, or the like feature points may be selected. The number of feature points to be selected differs according to the kind of desired invariant. For example, the invariant calculated from the three points is a similarity invariant (an invariant parameter for a geometrical change including rotation, parallel displacement, and scaling for a document image).

Figure 8A:
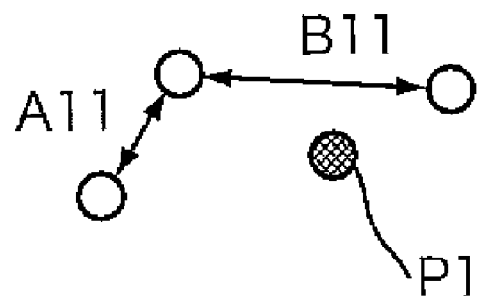
FIGS. 8A to 8C are explanation diagrams showing an example of calculation of an invariant with respect to a current feature point.
Figure 8B:
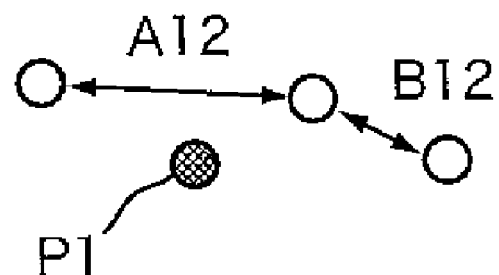
Figure 8C:
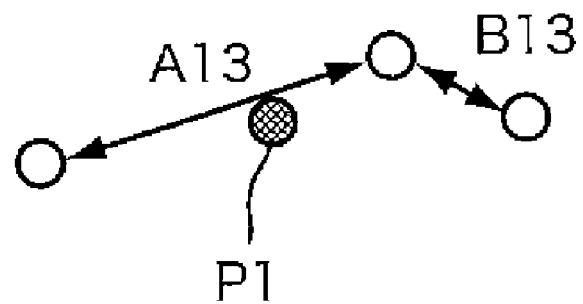
Figure 9A:
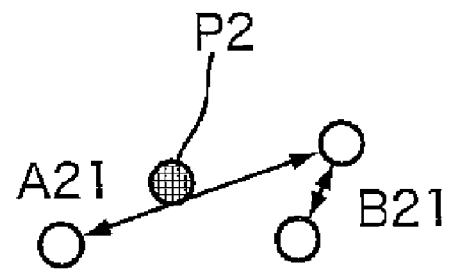
FIGS. 9A to 9C are explanation diagrams showing an example of calculation of an invariant with respect to a current feature point.
Figure 9B:
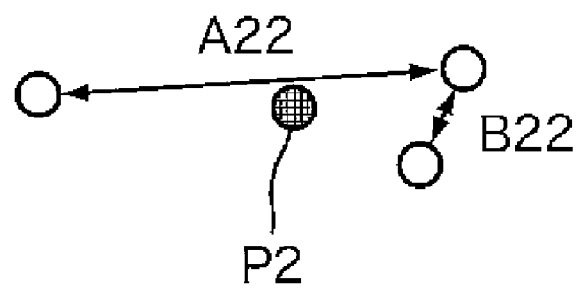
Figure 9C:
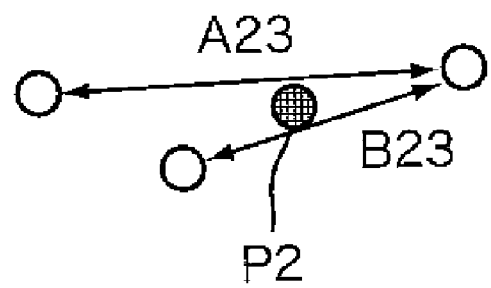
Figure 10B:
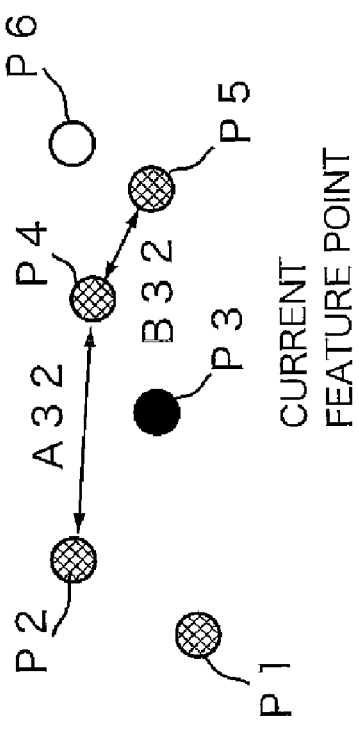
FIGS. 10A to 10D are explanation diagrams showing another example of calculation of an invariant with respect to a current feature point.
Figure 10D:
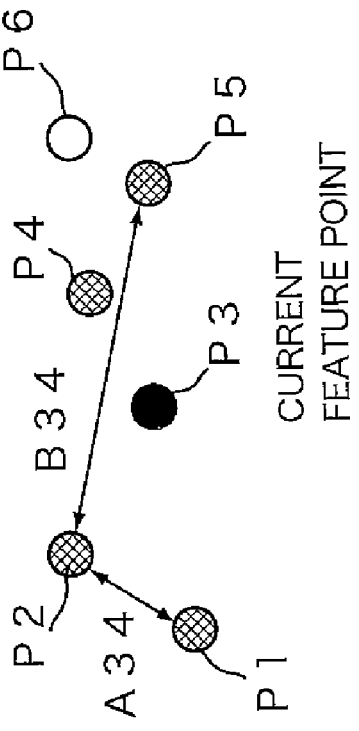
Figure 10A:
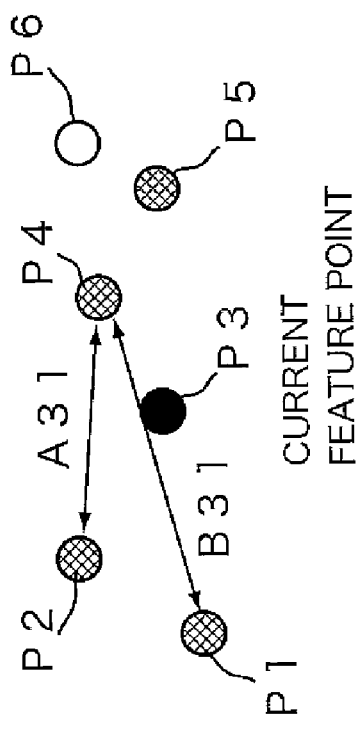
Figure 10C:
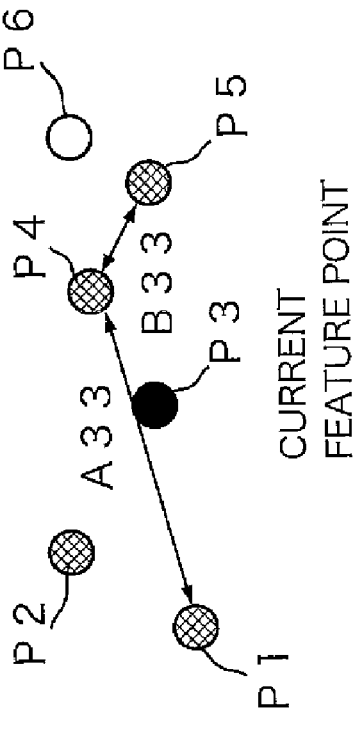
Figure 11A:
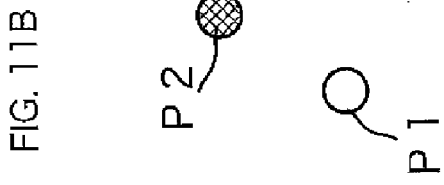
FIGS. 11A to 11D are explanation diagrams showing another example of calculation of an invariant with respect to a current feature point.
Figure 11B:
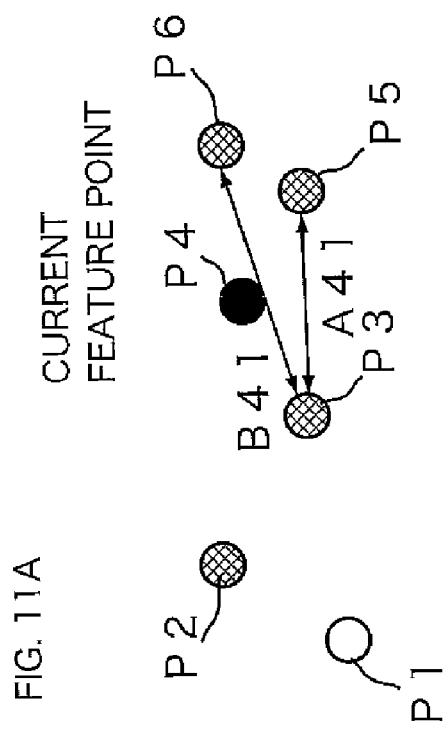
Figure 11C:
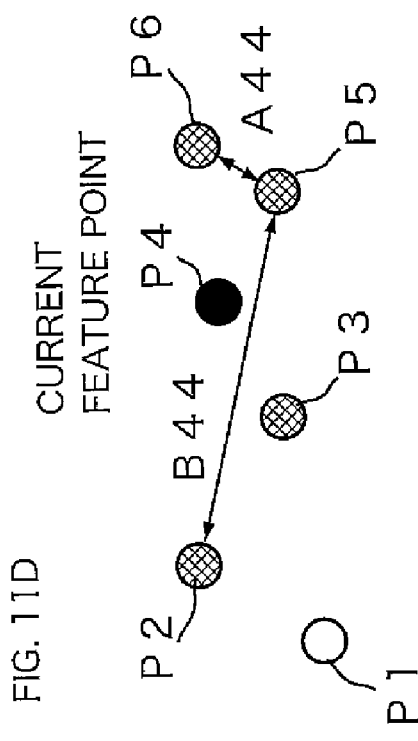
Figure 11D:
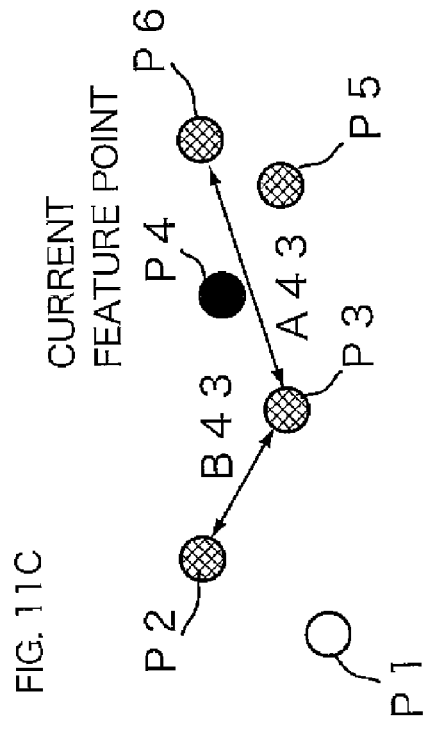

FIGS. 8A to 8C are explanation diagrams showing examples of calculation of an invariant with respect to a current feature point P1. FIGS. 9A to 9C are explanation diagrams showing examples of calculation of an invariant with respect to a current feature point P2. As shown in FIGS. 8A to 8C, three feature points are selected from the four feature points surrounding the current feature point P1. Then, three kinds of invariants are denoted respectively by H1$j$ ($j=1$, 2, 3). Each invariant H1$j$ is calculated by a formula expressed by H1$j$=A1$j$/B1$j$. Here, each of A1$j$ and B1$j$ indicates the distance between the feature points. The distance between feature points is calculated on the basis of the coordinate values of the individual surrounding feature points. Thus, for example, even when the document is rotated, moved, or inclined, the invariant H1$j$ does not vary. Accordingly determination of the similarity of the image is achieved with satisfactory accuracy, and hence similar documents can be classified with satisfactory accuracy.

Similarly, as shown in FIGS. 9A to 9C, three feature points are selected from the four feature points surrounding the current feature point P2. Then, three kinds of invariants are denoted respectively by H2$j$ ($j=1, 2, 3$). Each invariant H2$j$ is calculated by a formula expressed by H2$j$=A2$j$/B2$j$. Here, each of A2$j$ and B2$j$ indicates the distance between the feature points. Similarly to the above-mentioned case, the distance between feature points is calculated on the basis of the coordinate values of the individual surrounding feature points. In accordance with a similar procedure, invariants can be calculated for the other feature points.

On the basis of the invariants calculated for each current feature point, the features calculating section 242 calculates a hash value (features) Hi. The hash value Hi of the current feature point Pi is expressed by Hi=(Hi1×10$^2$+Hi2×10$^1$+Hi3×10$^0$)/E. Here, E is a constant determined by how large remainder is expected. For example, when the value is set to be "10", the remainder falls between "0" and "9". This gives the range that can be taken by the calculated hash value. Further, i is a natural number and denotes the identification number of a feature point.

FIGS. 10A to 10D are explanation diagrams showing other examples of calculation of an invariant with respect to a current feature point P3. FIGS. 11A to 11D are explanation diagrams showing other examples of calculation of an invariant with respect to a current feature point P4. As shown in FIGS. 10A to 10D, four kinds of combinations may be selected from the four points consisting of the surrounding feature points P1, P2, P4, and P5 of the current feature point P3. Then, similarly to the above-mentioned case, invariants H3$j$ (=1, 2, 3, 4) may be calculated by H3$j$=A3$j$/B3$j$.

Further, as shown in FIGS. 11A to 11D, four kinds of combinations may be selected from the four points consisting of the surrounding feature points P2, P3, P5, and P6 of the current feature point P4. Then, similarly to the above-mentioned case, invariants H4$j$ (j=1, 2, 3, 4) may be calculated by H4$j$=A4$j$/B4$j$. In the examples of FIGS. 10A to 10D and FIGS. 11A to 11D, the hash value Hi of the current feature point Pi is expressed by Hi=(Hi1×10$^3$+Hi2×10$^2$+Hi3×10$^1$+HI4×10$^0$)/E. Here, the above-mentioned hash value serving as features is an example, and is not limited to this. Another hash function may be employed. The above-mentioned example has been described for the case that four points are extracted as other surrounding feature points. However, the number of points is not limited to four, For example, six points may be extracted. In this case, five points may be extracted from the six feature points. Then, for each of the six kinds of methods of extracting five points, invariants may be calculated by extracting three points from the five points, so that a hash value may be calculated.

For example, when the images of a document composed of a plurality of pages are to be stored (in the case of a document storing mode), the features calculating section 242 sets up document type indices (e.g., DocID1, DocID2, . . . ). Each document type index corresponds to what identifies each sub-document (the type of a document) composed of a plurality of pages, and identifies a classification unit used when a large number of documents are classified document by document.

In the case of a document storing mode, the features calculating section 242 sets up document page indices (e.g., ID1, ID2, . . . ) of the reference images for each document type index. Each document page index is used for identifying each reference image, and identifies each document page constituting a document.

In the case of a document storing mode, the features calculating section 242 stores the hash values (e.g., H1, H2, . . . ) calculated in the above-mentioned processing and the set-up document page indices into the hash table for each reference image.

FIGS. 12A and 12B are explanation diagrams showing the structure of the hash table 2461. As shown in the figure, the structure of the hash table is constructed from individual fields consisting of the hash value and the document page index. More specifically, in correspondence to a document page index, a point index that indicates a position in the document and an invariant (both are not shown) are stored. For the purpose of determination of similarity of the image, collation information for the image, document image, or the like to be collated is stored into the hash table 2461 in advance. The hash table 2461 is stored in the memory 246. Here, as shown in FIG. 12B, when hash values are equal to each other (H1=H5), the two entries in the hash table 2461 may be unified.

Figures 13A, 13B:
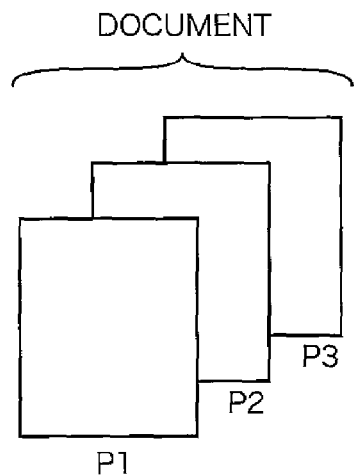
FIGS. 13A and 13B are explanation diagrams showing an example of a case that document images are stored.

FIGS. 13A and 13B are explanation diagrams showing an example of a case that document images are to be stored. As shown in FIG. 13A, when a document of three pages (P1, P2, P3) is to be stored, as shown in FIG. 13B, the features calculating section 242 sets up a document type index DocID1 for identifying the entirety of the document of three pages (the type of a document). The features calculating section 242 sets up document page indices ID1, ID2, and ID3 respectively in the page order for the images (P1, P2, P3) of three pages, and then calculates hash values (e.g., H1, H2, . . . ) for the individual images having document page indices ID1, ID2, and ID3, respectively. The features calculating section 242 sets up the set-up number of document page indexes into the number of stored pages ("3" in this example). The features calculating section 242 stores the document type indices, the document page indices, and the number of stored pages into a document classification table described later.

Figure 14:
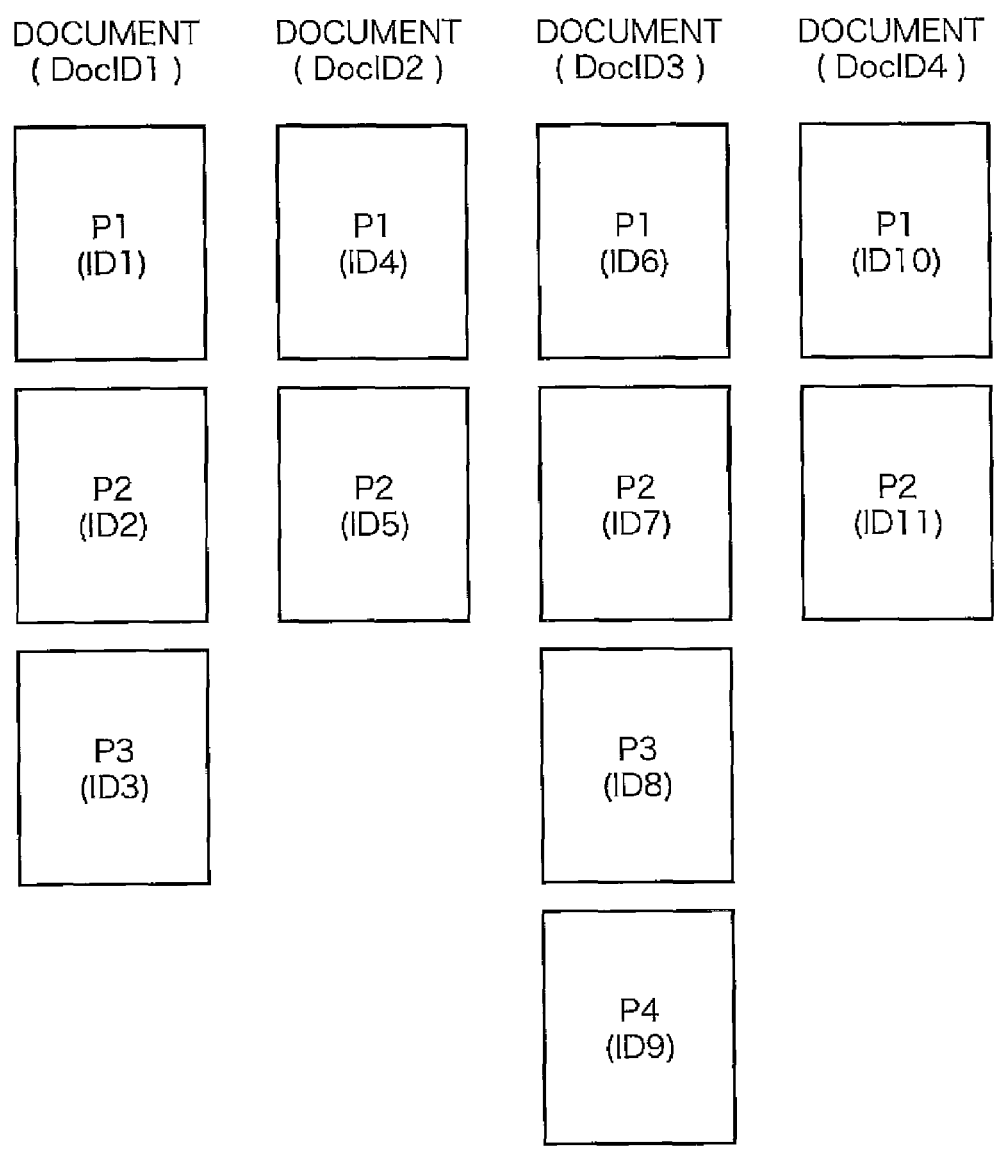
FIG. 14 is an explanation diagram showing an example of a document to be stored.

FIG. 14 is an explanation diagram showing an example of a document to be stored. The following description is given for the case that four types of documents are to be stored as shown in FIG. 14. A document type index DocID1 is set up for a document composed of reference images of three pages. Then, document page indices ID1, ID2, and ID3 are set up for these pages. Similarly, a document type index DocID2 is set up for a document composed of reference images of two pages. Then, document page indices ID4 and ID5 are set up for these pages. Further, a document type index DocID3 is set up for a document composed of reference images of four pages. Then, document page indices ID6, ID7, ID8, and ID9 are set up for these pages. Further, a document type index DocID4 is set up for a document composed of reference images of two pages. Then, document page indices ID10 and ID11 are set up for these pages. Here, output processing for a document contained in the document type index can be selected and set up for each stored document type index.

FIG. 15 is an explanation diagram showing an example of output processing. The output processing is classified, for example, in accordance with an option number. Thus, in a document storing mode for storing a document, a user can input or select an option number through the operation panel 4 so as to set up the contents of the output. As shown in FIG. 15, for example, when an option OP1 is selected, filing of the document images is permitted, and the document images are filed in a predetermined location in the form of an electronized document. Here, the configuration may be such that when filing permission is selected, a location (e.g., a folder) for filing can be selected. Further, in place of the selection by a user, the option number may be set up in advance in the apparatus.

Further, when an option OP2 is selected, the document images are encrypted in a predetermined encryption processing section (not shown), then filing is permitted, and then the document images are filed in a predetermined location. Similarly for options OP3 to OP7, the contents of processing shown in FIG. 15 can be set up. Here, these contents of processing are exemplary, and the present invention is not limited to these.

FIG. 16 is an explanation diagram showing the structure of a document classification table 2462. The document classification table 2462 is constructed from individual fields consisting of the document type index, the document page index, the number of stored pages, and the option number that indicates output processing. In a document storing mode, the document classification table 2462 is updated at each time when which a document is stored. FIG. 16 is a diagram showing a document classification table 2462 in a case that four types of documents shown in FIG. 14 are stored. That is, in correspondence to a document type index DocID1, reference images having document page indices identified by ID1, ID2, and ID3 are stored. Further, the number of stored pages is "3". Then, output processing having an option number indicated by OP1 is performed. When a document image similar to any one of these reference images is inputted, the inputted document image is classified into a document indicated by the document type index DocID1. Then, output processing having an option number indicated by OP1 is performed.

That is, in correspondence to a document type index DocID2, reference images having document page indices identified by ID4 and ID5 are stored. Further, the number of stored pages is "2". Then, output processing having an option number indicated by OP2 is performed. When a document image similar to any one of these reference images is inputted, the inputted document image is classified into a document indicated by the document type index DocID2. Then, output processing having an option number indicated by OP2 is performed. The situation is similar also for document type indices DocID3 and DocID4.

When the inputted document images are to be classified, in a case that it is to be determined whether each document image is similar to a reference image stored in advance, the features calculating section 242 stores into the memory 246 the calculated hash values of the individual document images.

On the basis of the hash value (features) calculated by the features calculating section 242, the vote processing section 243 searches the hash table stored in the memory 246.

When the hash value agrees, the vote processing section 243 votes for the document page index stored at the hash value (that is, the image having the agreeing hash value). The vote processing section 243 outputs to the similarity determining section 224 the number of obtained votes obtained by accumulating the votes, as the voting result.

On the basis of the voting result inputted from the vote processing section 243, the similarity determining section 244 determines whether the document image is similar to any reference image, and then outputs the determination result to the document classification processing section 245. More specifically the similarity determining section 244 divides the number of votes inputted from the vote processing section 243 by the greatest number of votes of the document image (expressed by the number of feature points× the number of hash values calculated from one feature point), so as to calculates a normalized similarity. Then, the similarity determining section 244 compares the calculated similarity with a threshold Th (e.g., 0.8) determined in advance. When the similarity is greater than or equal to the threshold Th, the similarity determining section 244 determines that the document image is similar to the reference image in which the similarity has been calculated. When the similarity is smaller than the threshold Th, the similarity determining section 244 concludes the absence of a reference image similar to the document image, and then outputs the determination result (a document page index when similarity is concluded) to the document classification processing section 245. Here, the number of votes inputted from the vote processing section 243 may be compared with a threshold defined in advance. Then, when the number of votes is greater than or equal to the threshold, it may be determined that the document image is similar to a reference image stored in advance, and further it may be determined that a reference image having the greatest number of votes among the reference images determined as being similar is identical to the document image.

Figure 17:
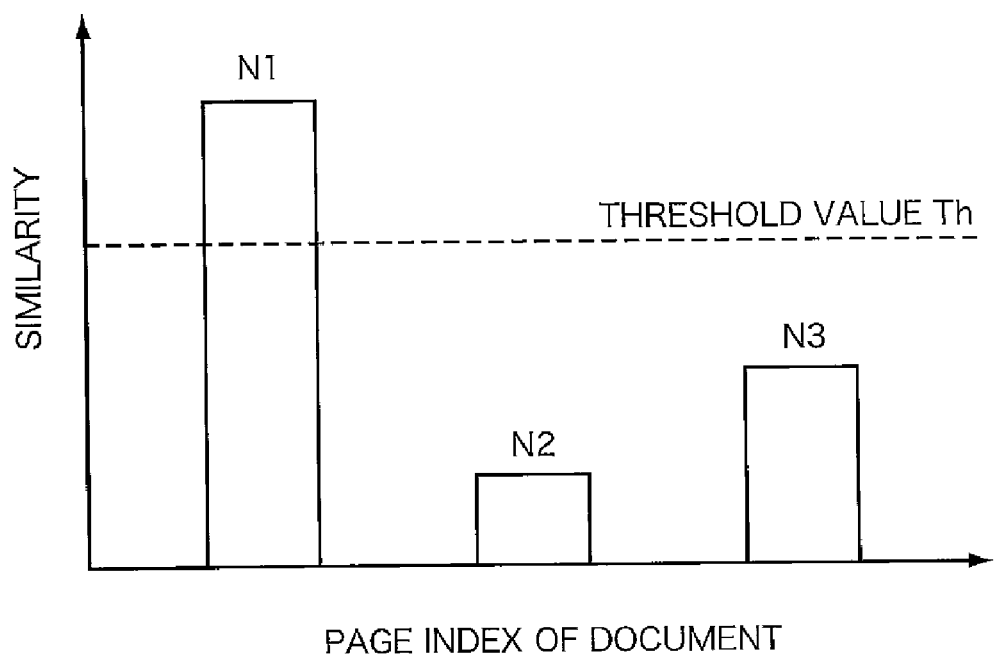
FIG. 17 is an explanation diagram showing an example of similarity determination based on a voting result.

FIG. 17 is an explanation diagram showing an example of similarity determination based on a voting result. As shown in FIG. 13, it is assumed that voting has been performed by searching the hash table for each hash value calculated from a document image so that the vote has been given to the reference images having document page indices indicated by ID1, ID2, and ID3. Then, each number of votes obtained as a result of the voting is divided by the greatest number of votes of the document image, so that normalized similarities N1, N2, and N3 are calculated. The reference image having a calculated similarity greater than or equal to the threshold Th is that has the document page index ID1. Thus, the document image is determined as being similar to the reference image having the document page index ID1.

The document classification processing section 245 includes: DocID(c) that indicates the document type index of the current page under processing; DocID(p) that indicates the document type index of the preceding page; and a page counter PC that indicates the page number under processing. Before the processing, the current document type index DocID(c), the preceding page document type index DocID (p), and the page counter PC are all initialized into "0".

On the basis of a document page index that is the determination result inputted from the similarity determining section 244, the document classification processing section 245 searches the document classification table 2462 so as to identify a document type index containing this document page index, and then sets the identified document type index into the current document type index DocID(c).

The document classification processing section 245 determines whether the preceding page document type index DocID(p) agrees with the current document type index DocID(c). In case of agreement, the page counter PC is incremented by adds "1". In case of disagreement, the page counter PC is set at "1".

The document classification processing section 245 searches the document classification table 2462 and determines whether the value in the page counter PC agrees with the number of stored pages. In case of disagreement, the value of the current document type index DocID(c) is set into the preceding page document type index DocID(p). In case of agreement, the preceding page document type index DocID (p) is set at "0". At the same time, the current document image is concluded as being the last document image contained in the document classified in accordance with the current document type index, so that a dividing signal (indicating a dividing position for the document) for the document is outputted.

The dividing signal for the document is, for example, transmitted and outputted together with the document image to a printer or a multi-function printer via a network. Alternatively, the dividing signal is directly outputted to a printer via a computer. In this case, the printer, the multi-function printer, or the computer receives the dividing signal together with an option number so as to perform necessary output processing.

By virtue of this, without the necessity of special operation by a user, inputted document images can easily be classified in accordance with a configuration for a document stored in advance. Further, the inputted document images can be classified by the unit of the number of document sheets stored in advance. Further, even when a large number of document images are inputted, the document images can easily be partitioned, while positions between documents to be classified can be detected and separated.

Figure 18:
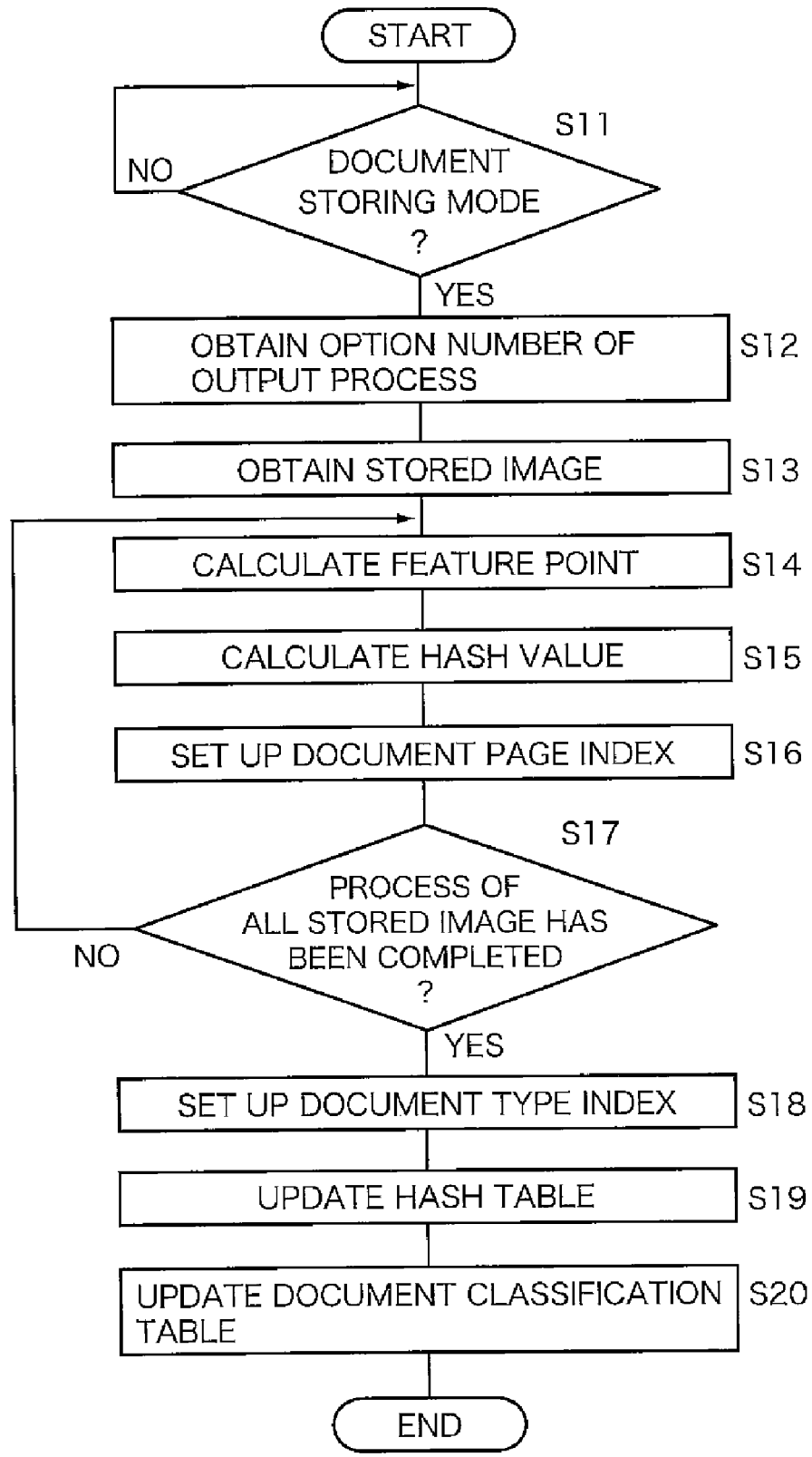
FIG. 18 is a flow chart showing a procedure of document storing processing.

Next, the operation of the color image processing apparatus 2 is described below. FIG. 18 is a flow chart showing the procedure of document storing processing. Here, in addition to being performed by a dedicated hardware circuit such as the document matching process section 24, the document storing processing may be performed by a method in which a computer program that defines the procedure of document storing processing is loaded onto a personal computer having a CPU, a RAM, a ROM, and the like and then the computer program is executed by the CPU. In the following description, the color image processing apparatus 2 is referred to as a "processing section".

The processing section determines whether the mode is a document storing mode (S11). When the mode is not a document storing mode (NO at S11), the processing section continues the processing of step S11, and waits until a user specifies a document storing mode through the operation panel 4. When the mode is a document storing mode (YES at S11), the processing section obtains an option number of output processing selected by a user through the operation panel 4 (S12).

The processing section obtains reference images (S13). At the time, the reference image may be obtained by reading a document through a document reading apparatus, or alternatively by receiving electronic data generated by application software in a processing apparatus such as a personal computer.

The processing section calculates the feature points of the reference image (S14), and then on the basis of the calculated feature points, calculates a hash value (features) (S15). The processing section sets up a document page index of the reference image (S16), and determines whether processing for all the reference images has been completed (S17).

When processing for all the reference images is not completed (NO at S17), the processing section continues the processing at and after step S14 so as to calculate the hash values of the remaining reference images and set up document page indices. When the processing has been completed for all the reference images (YES at S17), the processing section sets up a document type index (S18). As a result, a document type index is set up that contains one or a plurality of reference images. Further, document page indices for the individual reference images are set up in correspondence to the document type index.

The processing section stores the set-up document page indices and the calculated hash values into the hash table 2461 so as to update the hash table 2461 (S19). Then, the processing section stores into the document classification table 2462 the document type index, the document page indices, and the number of stored pages which have been set up as well as the obtained option number, so as to update the document classification table 2462 (S20), and then terminates the processing.

Figure 19:
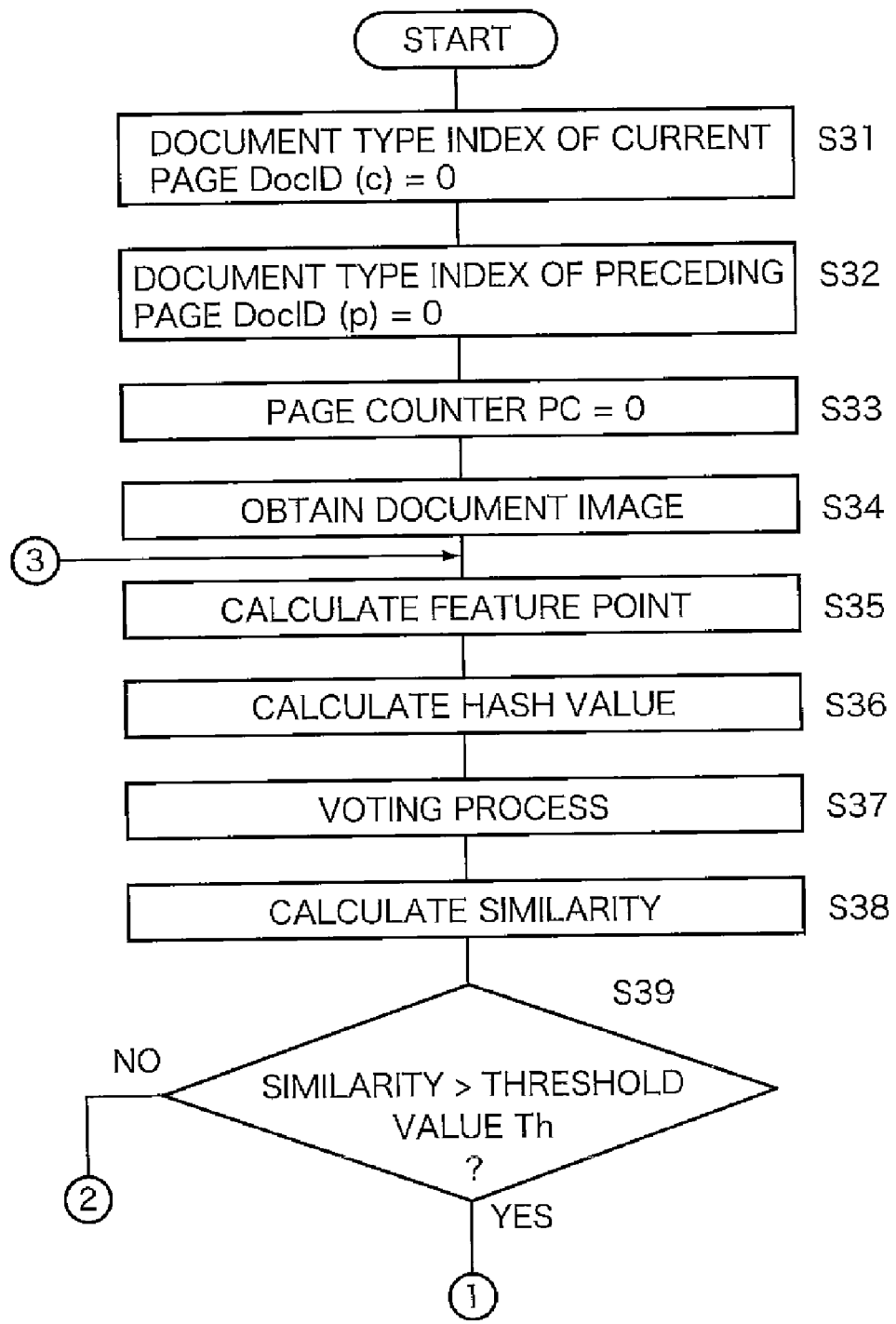
FIG. 19 is a flow chart showing a procedure of document classification processing.
Figure 20:
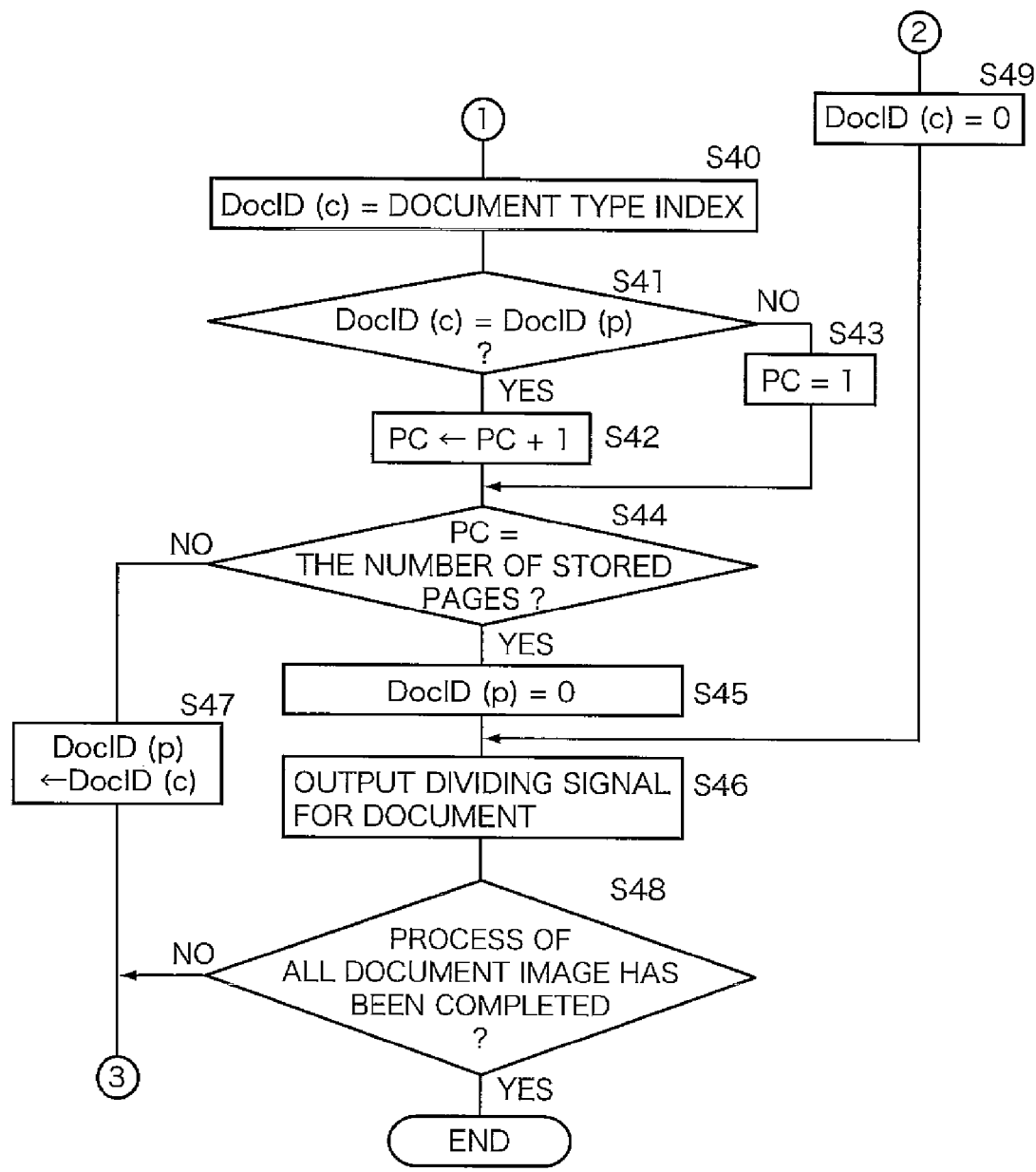
FIG. 20 is a flow chart showing a procedure of document classification processing.

FIG. 19 and FIG. 20 is a flow chart showing the procedure of document sorting processing. Here, in addition to being performed by a dedicated hardware circuit such as the document matching process section 24, the document classification processing also may be performed by a method in which a computer program that defines the procedure of document storing processing is loaded onto a personal computer having a CPU, a RAM, a ROM, and the like and then the computer program is executed by the CPU.

The processing section sets "0" into DocID(c) that indicates the document type index of the current page (S31), then sets "0" into DocID(p) that indicates the document type index of the preceding page (S32), and then sets "0" into the page counter PC (S33). As a result, the current document type index DocID(c), the preceding page document type index DocID(p), and the page counter PC are initialized.

The processing section obtains a document image (S34). At that time, the document image may be obtained by reading a document through a document reading apparatus. Alternatively, the document image may be obtained by receiving electronic data generated by a processing apparatus such as a personal computer.

The processing section calculates the feature points of the document image (S35), and then on the basis of the calculated feature points, calculates a hash value (features) (S36). On the basis of the calculated hash value, the processing section searches the hash table 2461, and performs voting for a document page index having the same hash value (S37). Then, on the basis of the result of the voting, the processing section calculates a similarity (S38), and then determines whether the calculated similarity is greater than the threshold Th (S39).

When the similarity is greater than a threshold Th (YES at S39), on the basis of the document page index of a reference image similar to the document image, the processing section searches the document classification table 2462 so as to identify a document type index containing this document page index, and then sets the identified document type index into the current document type index DocID(c) (S40).

The processing section determines whether the current document type index DocID(c) agrees with the preceding page document type index DocID(p) (S41). In case of agreement (YES at S41), the processing section increments the page counter PC by "1" (S42). In case of disagreement (NO at S41), the processing section sets "1" into the page counter PC (S43).

The processing section searches the document classification table 2462 so as to determine whether the value in the page counter PC agrees with the number of stored pages (S44). In case of agreement (YES at S44), the processing section sets "0" into the preceding page document type index DocID(p) (S45), then concludes that the current document image is the last document image contained in the document classified in accordance with the current document type index, and then outputs a dividing signal for the document (S46).

When the page counter PC does not agree with the number of stored pages (NO at S44), the processing section sets the value of the current document type index DocID(c) into the preceding page document type index DocID(p) (S47), and then continues the processing at and after step S35.

The processing section determines whether processing for all the document images has been completed (S48). When processing for all the document images is not completed (NO at S48), the processing section continues the processing at and after step S35 so as to process the remaining document images. When the processing has been completed for all the document images (YES at S48), the processing section terminates the processing. When the similarity is not greater than the threshold Th (NO at S539), the processing section sets "0" into the current document type index DocID(c) (S49), and then continues the processing at and after step S46.

When a dividing signal for the document indicating that the current document image is the last document image contained in the document classified in accordance with the current document type index is outputted, for example, the contents of output processing for the document images can be changed in accordance with an option number at each time when the dividing signal for the document is received. By virtue of this, desired output processing can be performed on the document images classified for each document type index.

Embodiment 2

The method of classifying a document is not limited to that described in Embodiment 1. The following method may be adopted. That is, at each time when a document image is determined as being similar to a reference image, the document classification table 2462 may be searched on the basis of the document page index of the reference image, so that a document type index containing this document page index may be identified. Then, the number of document images each determined as being similar to a reference image may be counted and stored in correspondence to the identified document type index. Then, it may be determined whether the stored number of document images agrees with the number of stored pages (the number of image identifiers) contained in the document type index (type identifier). In case of agreement, the document image may be determined as being the last document image classified in accordance with the document type index. In the counting and storing of the number of document images, for example, a page counter for the document type index may be utilized.

FIG. 21 is an explanation diagram showing the structure of the document classification table 2462 of Embodiment 2. The document classification table 2462 is constructed from individual fields consisting of the document type index, the page counter for the document type index, the document page index, the number of stored pages, and the option number that indicates output processing. The difference from the example of Embodiment 1 is that the document type index and the page counter for the document type index are stored in correspondence to each other. Similarly to Embodiment 1, in a document storing mode, the document classification table 2462 is updated at each time when a document is stored. FIG. 21 is a diagram showing a document classification table 2462 in a case that four types of documents shown in FIG. 14 are stored.

Figure 22:
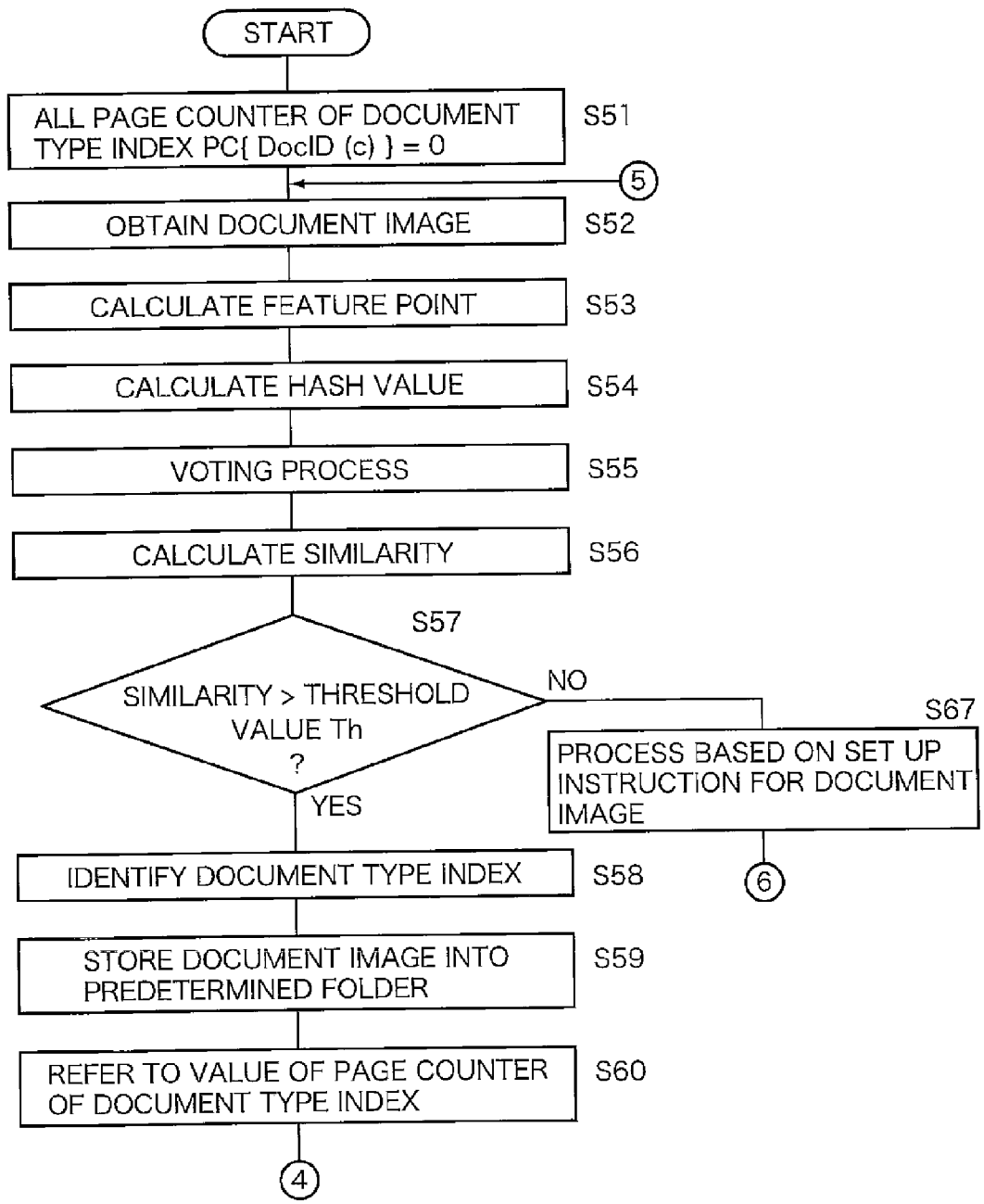
FIG. 22 is a flow chart showing a procedure of document sorting processing of Embodiment 2.
Figure 23:
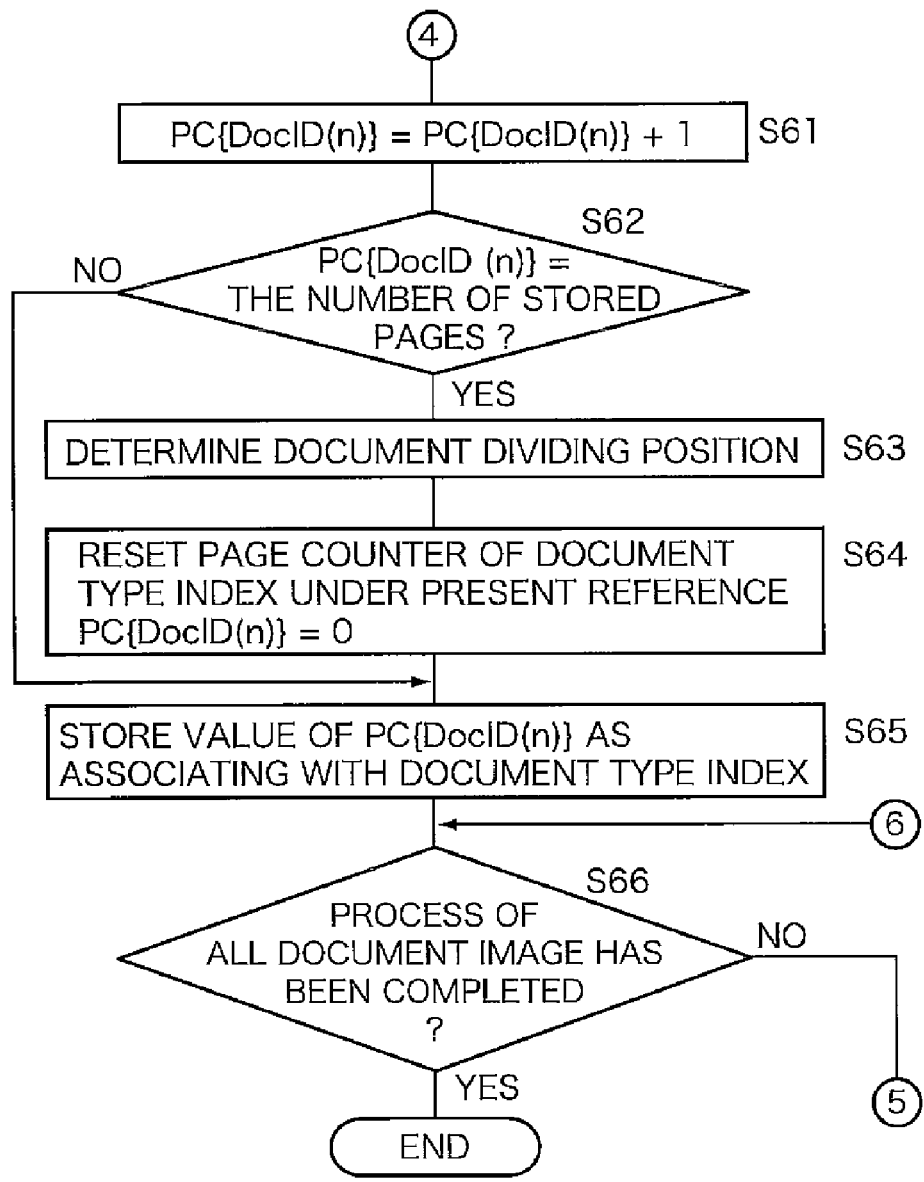
FIG. 23 is a flow chart showing a procedure of document sorting processing of Embodiment 2.

FIGS. 22 and 23 are a flow chart showing the procedure of document sorting processing of Embodiment 2. The following description is given for the case that document images are stored (filed) temporarily into a folder. Further, when processing indicated by an option number is to be performed, the processing corresponding to the option number can be performed on the data of the document images read from the folder.

The processing section sets 0 into all the document type index page counters PC{DocID(n)} corresponding to the stored document images (the document type index) composed of a plurality of pages (S51). As a result, the page counters PC{DocID(n)} of the document type index are reset. Here, n indicates the number of document type indexes.

The processing section obtains a document image (S52). Also at this time, the document image may be obtained by reading a document through a document reading apparatus. Alternatively, the document image may be obtained by receiving electronic data generated by a processing apparatus such as a personal computer.

The processing section calculates the feature points of the document image (S53), and then on the basis of the calculated feature points, calculates a hash value (features) (S54). On the basis of the calculated hash value, the processing section searches the hash table 2461, and performs voting for a document page index having the same hash value (S55). Then, on the basis of the result of the voting, the processing section calculates a similarity (S56), and then determines whether the calculated similarity is greater than the threshold Th (S57).

When the similarity is greater than the threshold Th (YES at S57), on the basis of the document page index of a reference image similar to the document image, the processing section searches the document classification table 2462 so as to identify a document type index containing this document page index (S58), and then stores the document image into a predetermined folder (S59).

The processing section refers to the value of the page counter PC{DocID(n)} of the document type index (S60), and increments by 1 the page counter PC{DocID(n)} of the document type index (S61). The processing section determines whether the page counter PC{DocID(n)} of the document type index agrees with the number of stored pages (S62). In case of agreement (YES at S62), the processing section determines that the current document image is at a dividing position of the document corresponding to the document type index under reference (S63).

The processing section resets into 0 the page counter PC{DocID(n)} of the document type index under present reference (S64), and then stores the value of the page counter PC{DocID(n)} of the document type index to association with the document type index (S65).

The processing section determines whether processing for all the document images has been completed (S66). When processing for all the document images is not completed (NO at S66), the processing section continues the processing at and after step S52 so as to process the remaining document images. When the processing has been completed for all the document images (YES at S66), the processing section terminates the processing.

When the page counter PC{DocID(n)} of the document type index does not agree with the number of stored pages (NO at S62), the processing section continues the processing at and after step S65. Further, when the similarity is not greater than the threshold Th (NO at S57), the processing section performs processing on the basis of the contents set up for the document image (S67), and then performs the processing at and after step S66. Here, the contents set up for the document image is, for example, the contents of processing set up through the operation panel 4 of the image forming apparatus, or alternatively the contents of processing set up by application software in a computer system or the like.

Since the configuration is adopted that the values of the page counters PC{DocID(n)} of the document type index are stored in correspondence to the document type index, even when page substitution arises between a plurality of sub-documents to be classified, classification of the document and partitioning of the document are achieved.

Embodiment 3

The above-mentioned Embodiments 1 and 2 may be applied to electronic data (data generated by application software) or scanned filing data (data generated by converting data read by a scanner into a predetermined file format such as JPEG and PDF). For example, data provided in the form of electronic data or scanned filing data may be stored in a server. Then, the present invention in the form of application software may be applied to such data. Preferably, the data described here is stored separately for each electronic data and file format.

As for electronic data, several kinds of software can be used. Thus, for example, using a RIP (raster image processor), PDL (Page Description Language) may be interpreted and converted into a raster image (RGB data). Then, the method of the present application may be applied.

Further, as for scanned filing data, for example, in the case of an encoded image format such as JPEG and GIF, the method of the present application may be applied, after decoding is once performed and then color conversion processing of converting YCC signals into RGB signals is performed when necessary.

Further, as for a PDF format, when the image data is saved in an encoded image format such as JPEG, the method of the present application may be applied after decoding and conversion into RGB signals are performed. As for a vector data part such as a font, the method of the present application may be applied after conversion into image data of RGB is performed by a RIP or the like. In the case of a PDF format, information concerning each object (such as a text, a diagram, and a photograph) is stored as a tag. Thus, the data conversion can be performed with reference to this information. For example, in the case of a text, the information concerning an object includes the font, the point size, the color, and the display position. In the case of a photograph, the information includes the coding method, the size, and the display position.

Figure 24:
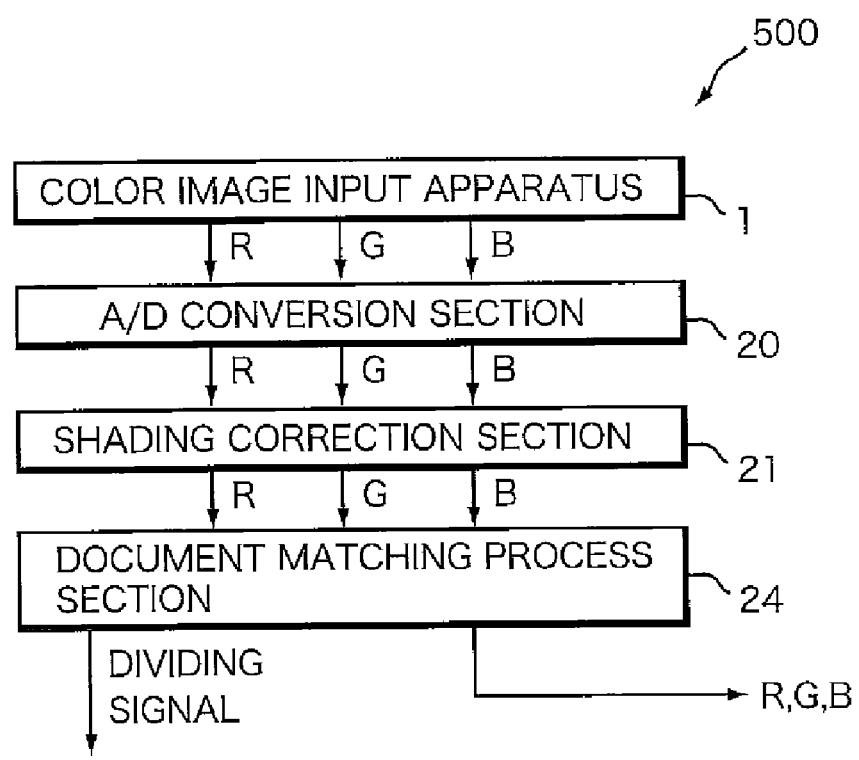
FIG. 24 is a block diagram showing a configuration of an image reading apparatus according to the present embodiment.

FIG. 24 is a block diagram showing the configuration of an image reading apparatus 500 according to the present embodiment. As shown in the figure, the image reading apparatus 500 includes a color image input apparatus 1, an A/D conversion section 20, a shading correction section 21, and a document matching process section 24. The color image input apparatus 1, the A/D conversion section 20, the shading correction section 21, and the document matching process section 24 are similar to those of the above-mentioned image forming apparatus 100, and hence description is omitted.

As described above, in the present application, when a document composed of a plurality of pages (e.g., fixed form sheets) is to be scanned so that an electronic document is to be generated, information concerning the document composed of a plurality of pages is stored in advance together with collation information for the fixed forms of a plurality of pages. Then, similarity is checked between reference images and the document images, so that positions between the documents to be classified are detected. By virtue of this, the document images are classified into the form of a stored document, so that electronic documents can be generated. That is, without the necessity of special operation by a user, document images can easily be classified in accordance with a configuration for a document stored in advance. Further, even when the number of sheets for each sub-document stored in advance differs from each other, the document images can be classified in the unit of the number of document sheets. Further, when a large number of document images are to be classified, the document is easily partitioned, and positions between the documents to be classified can be detected and separated. Further, even when page substitution arises between a plurality of sub-documents to be classified, classification of the document and partitioning of the document are achieved. Further, without the necessity of storing the reference images themselves, document images each similar to a reference image can easily be classified merely by storing features corresponding to the reference images. Further, output processing such as filing (recording), copying, facsimile transmission, and electronic distribution is achieved separately for each document image to be classified. Further, without the necessity of special operation by a user, a configuration for a document to be classified can easily be stored.

The above-mentioned embodiments have been described for the case that examples of output processing are filing, copying, and electronic distribution. However, control of output processing is not limited to these. That is, at the time of filing, copying, and electronic distribution, output processing may be controlled for a part of the document images, instead of the entire document images. For example, copying and electronic distribution may be inhibited for a part that contains important matter, secret matter, or the like within a fixed form.

The above-mentioned embodiments have been described for the case that document images are classified, filed, and the like so that an electronic document is generated. However, the present invention is not limited to this. For example, a plurality of document ejection destinations may be provided. Then, when a large number of documents are to be read through an ADF, the read documents may be ejected in a manner classified for each document type index on the basis of the dividing signals for the documents. This avoids time and effort of manually classifying a large number of documents, and hence improves the user's convenience.

In the above-mentioned embodiments, the color image input apparatus 1 may be implemented by, for example, a flat-bed scanner, a film scanner, a digital camera, or a portable telephone. Further, the color image output apparatus 3 may be implemented by, for example: an image display device such as a CRT display and a liquid crystal display; or a printer employing an electrophotography method or an inkjet method that outputs the processing result onto a recording paper sheet or the like. Furthermore, the image forming apparatus 100 may be provided with a modem serving as communication means for connecting with a server apparatus and the like via a network. Further, in place of acquiring color image data from the color image input apparatus 1, the color image data may be obtained from an external storage device, a server apparatus, or the like via a network.

In the above-mentioned embodiments, the memory 246 and the control section 247 have been provided in the inside of the document matching process section 24. However, the present invention is not limited to this. That is, the memory 246 and the control section 247 may be provided in the outside of the document matching process section 24.

Further, a program code for controlling document storing processing, document sorting processing, and output processing for document images may be recorded on a computer-readable recording medium for recording a program code (an executable program, an intermediate code program, a source program) to be executed by a computer. By virtue of this, a recording medium that stores a computer program for controlling the above-mentioned document storing processing, document sorting processing, and output processing for document images can be provided in a portable manner. In order that that processing can be performed by a microcomputer, the recording medium may be a program medium such as a memory (not shown) like a ROM. Alternatively, a program media of another type may be employed in which a program reading apparatus serving as an external storage device (not shown) is provided and a recording medium is inserted into there so that the recording medium is read.

In these cases, the stored program code may be accessed and executed directly by a microprocessor. Alternatively, the program code may be read out, then the read-out program code may be downloaded into a program storage area (not shown) in a microcomputer, and then the program code may be executed. In this case, a computer program for download is stored in the main apparatus in advance.

Here, the above-mentioned program medium is a recording medium separable from the main body, and may be: a tape system such as a magnetic tape and a cassette tape; a disk system such as a magnetic disk (including a flexible disk and a hard disk) and an optical disk such as CD-ROM/MO/MD/DVD; a card system such as an IC card (including a memory card) and an optical card; and a medium that carries a program code in a fixed manner, including a semiconductor memory such as a mask ROM, an EPROM (Erasable Programmable Read Only Memory), an EEPROM (Electrically Erasable Programmable Read Only Memory), and a flash ROM.

Further, in this case, since the employed system configuration permits connection to a communication network including the Internet, the medium may carry the program code dynamically, for example, by means of downloading the program code from a communication network. Here, when the program code is to be downloaded from a communication network, a computer program for download may be stored in the main apparatus in advance, or alternatively may be installed from another recording medium. Here, the present application may be implemented in the form of a computer data signal in which the above-mentioned program code is embedded in a carrier wave embodied by electronic transmission.

As this invention may be embodied in several forms without departing from the spirit of essential features thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image processing method performed by an image processing apparatus, comprising:
   storing, to a storage section, a plurality of type identifiers each of which contains one or a plurality of image identifiers each for identifying each of a plurality of reference images and thereby identifies a type of a document;
   generating, by the image processing apparatus, a hash table indicative of a relationship between hash values and the plurality of image identifiers for each of the plurality of reference images;
   determining, by a controller, whether each of a plurality of obtained document images is similar to a reference image based on the hash values;
   when a document image is determined as being similar to the reference image, selecting, by the controller, an image identifier that identifies said reference image, from among the plurality of image identifiers;
   identifying, by the controller, a type identifier that contains the selected image identifier;
   classifying, by the controller, document images each similar to the reference image, for each identified type identifier, wherein document images in the number of image identifiers contained in a type identifier are classified for each type identifier;
   at each time when a document image is determined as being similar to a reference image, the controller counting up the number of document images determined as being similar;
   determining, by the controller, whether the counted number of document images is equal to the number of image identifiers contained in the type identifier;
   when said number of document images is determined as being equal to the number of image identifiers, the controller determining that said document image is the last document image to be classified to said type identifier, and
   outputting the classified document images to an image output apparatus.

2. The image processing method according to claim 1, further comprising:
   controlling output processing for the document images is performed separately for each type identifier.

3. An image processing method performed by an image processing apparatus, comprising:
   storing, to a storing section, a plurality of type identifiers each of which contains one or a plurality of image identifiers each for identifying each of a plurality of reference images and thereby identifies a type of a document;
   generating, by the image processing apparatus, a hash table indicative of a relationship between hash values and the plurality of image identifiers for each of the plurality of reference images;
   determining, by a controller, whether each of a plurality of obtained document images is similar to a reference image based on the hash values;
   when a document image is determined as being similar to the reference image, the controller selecting an image identifier that identifies said reference image, from among the plurality of image identifiers;
   identifying, by the controller, a type identifier that contains the selected image identifier,
   classifying, by the controller, document images each similar to the reference image, for each identified type identifier, wherein document images in the number of image identifiers contained in a type identifier are classified for each type identifier;

at each time when a document image is determined as being similar to a reference image, the controller, counting up the number of document images determined as being similar;

storing, to the storage section, the counted number of document images, as associating with the type identifier;

determining, by the controller, whether the number of stored document images is equal to to the number of image identifiers contained in said type identifier;

when said number of document images is determined as being equal to the number of image identifiers, the controller determining that said document image is the last document image to be classified to said type identifier, and outputting the classified document images to an image output apparatus.

4. An image processing method performed by an image processing apparatus, comprising:

storing, to a storage section, a plurality of type identifiers each of which contains one or a plurality of image identifiers each for identifying each of a plurality of reference images and thereby identifies a type of a document;

generating, by the image processing apparatus, a hash table indicative of a relationship between hash values and the plurality of image identifiers for each of the plurality of reference images;

determining, by a controller, whether each of a plurality of obtained document images is similar to a reference image based on the hash values;

when a document image is determined as being similar to the reference image, the controller selecting an image identifier that identifies said reference image, from among the plurality of image identifiers;

identifying, by the controller, a type identifier that contains the selected image identifier, classifying, by the controller, document images each similar to the reference image, for each identified type identifier, storing, to the storage section, features and image identifiers of the reference images as being associated with each other;

extracting, by the controller, features of a document image;

identifying, by the controller, an image identifier on the basis of the extracted features and the stored features of a reference image;

determining, by the controller, that said document image is similar to a reference image identified by said image identifier; and outputting the classified document images to an image output apparatus.

5. An image processing method performed by an image processing apparatus, comprising:

storing, to a storage section, a plurality of type identifiers each of which contains one or a plurality of image identifiers each for identifying each of a plurality of reference images and thereby identifies a type of a document;

generating, by the image processing apparatus, a hash table indicative of a relationship between hash values and the plurality of image identifiers for each of the plurality of reference images;

determining, by a controller, whether each of a plurality of obtained document images is similar to a reference image based on the hash values;

when a document image is determined as being similar to the reference image, the controller selecting an image identifier that identifies said reference image, from among the plurality of image identifiers;

identifying, by the controller, a type identifier that contains the selected image identifier;

classifying, by the controller, document images each similar to the reference image, for each identified type identifier, receiving, by the controller, an instruction for storing a reference image;

setting up, by the controller, an image identifier that identifies one or a plurality of the reference images having been inputted;

setting up, by the controller, a type identifier that contains the set-up image identifier;

extracting, by the controller, features of said reference image;

storing, in the storage section, the type identifier and the image identifier having been set up as well as the extracted features, as associating with each other, and outputting the classified document images to an image output apparatus.

6. An image processing apparatus comprising:

a storage section for storing a plurality of type identifiers each of which contains one or a plurality of image identifiers each for identifying each of a plurality of reference images and thereby identifies a type of a document; and a hash table indicative of a relationship between hash values and the plurality of image identifiers for each of the plurality of reference images;

a controller configured to perform operations of:

determining whether each of a plurality of obtained document images is similar to a reference image based on the hash values;

when a document image is determined as being similar to the reference image, selecting an image identifier that identifies said reference image, from among the plurality of image identifiers;

identifying a type identifier that contains the selected image identifier;

classifying document images each similar to the reference image, for each identified type identifier, wherein document images in the number of image identifiers contained in a type identifier are classified for each type identifier;

at each time when a document image is determined as being similar to a reference image, counting up the number of document images determined as being similar;

determining whether the counted number of document images is equal to the number of image identifiers contained in the type identifier; and when said number of document images is determined as being equal to the number of image identifiers, determining that said document image is the last document image to be classified to said type identifier.

7. The image processing apparatus according to claim 6, wherein said controller is further configured to control output processing for the document images separately for each type identifier.

8. An image reading apparatus comprising:

an image reading section for reading an image; and an image processing apparatus according to claim 6; wherein the image read by said image reading apparatus is processed by said image processing apparatus.

9. An image forming apparatus comprising:
an image processing apparatus according to claim 6; and
an image forming section for forming an output image on the basis of the image processed by the image processing apparatus.

10. An image processing apparatus comprising:
a storage section for storing a plurality of type identifiers each of which contains one or a plurality of image identifiers each for identifying each of a plurality of reference images and thereby identifies a type of a document; and
a hash table indicative of a relationship between hash values and the plurality of image identifiers for each of the plurality of reference images,
a controller configured to perform capable of performing operations of:
determining whether each of a plurality of obtained document images is similar to a reference image based on the hash values;
when a document image is determined as being similar to the reference a reference image, selecting an image identifier that identifies said reference image, from among the plurality a plurality of image identifiers;
identifying a type identifier that contains the selected image identifier; and
classifying document images each similar to the reference a reference image, for each identified type identifier, wherein document images in the number of image identifiers contained in a type identifier are classified for each type identifier,
wherein said controller is further configured to perform operations of:
at each time when a document image is determined as being similar to a reference image, counting up the number of document images determined as being similar;
storing the counted number of document images, as associating with the type identifier;
determining whether the number of stored document images is equal to the number of image identifiers contained in said type identifier; and
when said number of document images is determined as being equal to the number of image identifiers, determining that said document image is the last document image to be classified to said type identifier.

11. An image processing apparatus comprising:
a storage section for storing a plurality of type identifiers each of which contains one or a plurality of image identifiers each for identifying each of a plurality of reference images and thereby identifies a type of a document; and
a hash table indicative of a relationship between hash values and the plurality of image identifiers for each of the plurality of reference images;
a controller configured to perform capable of performing operations of:
determining whether each of a plurality of obtained document images is similar to a reference image based on the hash values;
when a document image is determined as being similar to the reference a reference image, selecting an image identifier that identifies said reference image, from among the plurality a plurality of image identifiers;
identifying a type identifier that contains the selected image identifier; and
classifying document images each similar to the reference a reference image, for each identified type identifier, wherein features and image identifiers of the reference images are stored as being associated with each other in the storage section; and
said controller is further configured to perform operations of:
extracting features of a document image;
identifying an image identifier on the basis of the extracted features and the stored features of a reference image; and
determining that said document image is similar to a reference image identified by said image identifier.

12. An image processing apparatus comprising:
a storage section for storing a plurality of type identifiers each of which contains one or a plurality of image identifiers each for identifying each of a plurality of reference images and thereby identifies a type of a document; and
a hash table indicative of a relationship between hash values and the plurality of image identifiers for each of the plurality of reference images;
a controller configured to perform capable of performing operations of:
determining whether each of a plurality of obtained document images is similar to a reference image based on the hash values;
when a document image is determined as being similar to the reference a reference image, selecting an image identifier that identifies said reference image, from among the plurality a plurality of image identifiers;
identifying a type identifier that contains the selected image identifier; and
classifying document images each similar to the reference a reference image, for each identified type identifier,
wherein said controller is further configured to perform capable of performing operations of:
receiving an instruction for storing a reference image;
when the instruction is received, setting up an image identifier that identifies one or a plurality of the reference images having been inputted;
setting up a type identifier that contains the set-up image identifier;
extracting features of said reference image; and
storing into the storage section the type identifier and the image identifier having been set up as well as the extracted features, as associating with each other.

13. A non-transitory computer-readable medium storing thereon a computer program executable to perform the steps of:
determining whether each of a plurality of inputted document images is similar to any one of reference images based on a hash table indicative of a relationship between hash values and a plurality of image identifiers for each of the reference images;
when the document image is determined as being similar to a reference image, selecting an image identifier that identifies said reference image from among a plurality of image identifiers each for identifying the reference image;
identifying a type identifier that contains the selected image identifier, from among a plurality of type identifiers that contains one or the plurality of image identifiers and identifies a type of a document; and
classifying document images each similar to the reference image, for each identified type identifier, wherein document images in the number of image identifiers contained in a type identifier are classified for each type identifier;

at each time when a document image is determined as being similar to a reference image, counting up the number of document images determined as being similar, determining whether the counted number of document images is equal to the number of image identifiers contained in the type identifier; and when said number of document images is determined as being equal to the number of image identifiers, determining that said document image is the last document image to be classified to said type identifier.

* * * * *